US008576097B2

(12) United States Patent
Ugur et al.

(10) Patent No.: US 8,576,097 B2
(45) Date of Patent: Nov. 5, 2013

(54) CODING USING A MAPPING BETWEEN A SYNTAX ELEMENT AND A CODE WORD

(75) Inventors: Kemal Ugur, Tampere (FI); Antti Olli Hallapuro, Tampere (FI)

(73) Assignee: Nokia Corporation (FI)

( * ) Notice: Subject to any disclaimer, the term of this patent is extended or adjusted under 35 U.S.C. 154(b) by 7 days.

(21) Appl. No.: 13/177,126

(22) Filed: Jul. 6, 2011

(65) Prior Publication Data

US 2012/0169519 A1 Jul. 5, 2012

Related U.S. Application Data

(60) Provisional application No. 61/361,683, filed on Jul. 6, 2010.

(51) Int. Cl.
*H03M 7/34* (2006.01)

(52) U.S. Cl.
USPC ............ 341/51; 341/58; 341/67; 341/78; 341/85; 341/107; 375/240.02; 375/240.18; 375/240.23; 375/240.26; 707/802; 717/100; 382/224; 715/234; 715/235; 704/500

(58) Field of Classification Search
USPC ............ 341/50–107; 704/500; 715/234–235; 382/224; 717/100; 707/802; 375/240.02, 240.18, 240.23, 240.26, 375/E7.076, E7.126, E7.144, E7.026
See application file for complete search history.

(56) References Cited

U.S. PATENT DOCUMENTS

| | | | |
|---|---|---|---|
| 4,816,914 A | | 3/1989 | Ericsson |
| 5,452,104 A | | 9/1995 | Lee |
| 6,900,748 B2 * | | 5/2005 | Marpe et al. ................. 341/107 |
| 6,941,511 B1 * | | 9/2005 | Hind et al. .................... 715/235 |
| 7,088,271 B2 * | | 8/2006 | Marpe et al. ................. 341/107 |
| 7,199,735 B1 * | | 4/2007 | Wen et al. ..................... 341/107 |
| 7,281,771 B1 * | | 10/2007 | Wen et al. ..................... 341/107 |
| 7,385,535 B2 * | | 6/2008 | Yang et al. .................... 341/107 |
| 7,443,318 B2 * | | 10/2008 | Hung et al. ..................... 341/51 |
| 8,041,746 B2 * | | 10/2011 | Stuhec .......................... 707/802 |
| 2007/0080832 A1 * | | 4/2007 | Yang et al. ..................... 341/50 |
| 2010/0086031 A1 | | 4/2010 | Chen et al. |

FOREIGN PATENT DOCUMENTS

WO 2008086316 A2 7/2008

OTHER PUBLICATIONS

International Search Report and Written Opinion, received in corresponding Patent Cooperation Treaty Application No. PCT/IB2011/053008, dated Dec. 9, 2011, 14 pages.
Ugur, Kemal, "Descroption of Video Coding Technology Proposal by Tandberg, Nokia, Ericsson", JCT-VC meeting; Apr. 15, 2010-Apr. 23, 2010; Dresden; (Joint Collaborative Team on Video Coding of ISO/IEC JTC1/SC26/WG11 and ITU-T SG.16), nr. JCTVC-A119, Apr. 12, 2010, pp. 9-11, figures 8-10, Section 2.6.
Ugur, Kemal, "High Performance, Low Complexity Video Coding and the Emerging HEVC Standard", IEEE Transactions on Circuits and Systems for Video Technology, Dec. 1, 2010, vol. 20, nr. 12, pp. 1688-1697, ISSN 1051-8215; figures 1-2; Sections II.A-II.B.

* cited by examiner

*Primary Examiner* — Lam T Mai
(74) *Attorney, Agent, or Firm* — Banner & Witcoff, Ltd.

(57) ABSTRACT

A method comprising receiving a syntax element to be encoded as a code word of a set of code words, determining a mapping between the syntax element and the code word on the basis of a hierarchy level in a tree structure, using the mapping to obtain the code word, and updating the mapping is disclosed.

53 Claims, 12 Drawing Sheets

CODING USING A MAPPING BETWEEN A SYNTAX ELEMENT AND A CODE WORD

RELATED APPLICATION

The subject application claims priority benefit to U.S. Provisional Patent Application No. 61/361,683, filed Jul. 6, 2010, which is hereby incorporated in its entirety by reference.

TECHNICAL FIELD

There is provided a method for determining mapping between a syntax element and a code word for variable length encoding, a method for determining mapping between a syntax element and a code word for variable length decoding, an apparatus, a encoder and a decoder.

BACKGROUND INFORMATION

A video codec comprises an encoder which transforms input video into a compressed representation suitable for storage and/or transmission and a decoder than can uncompress the compressed video representation back into a viewable form. Typically, the encoder discards some information in the original video sequence in order to represent the video in a more compact form, for example at a lower bit rate.

Typical video codecs, operating for example according to the International Telecommunication Union's ITU-T H.263 and H.264 coding standards, encode video information in two phases. In the first phase, pixel values in a certain picture area or "block" are predicted. These pixel values can be predicted, for example, by motion compensation mechanisms, which involve finding and indicating an area in one of the previously encoded video frames (or a later coded video frame) that corresponds closely to the block being coded. Additionally, pixel values can be predicted by spatial mechanisms which involve finding and indicating a spatial region relationship.

The second phase is one of coding the error between the predicted block of pixels and the original block of pixels. This is typically accomplished by transforming the difference in pixel values using a specified transform. This transform is typically a Discrete Cosine Transform (DCT) or a variant thereof. After transforming the difference, the transformed difference is quantized and entropy encoded.

By varying the fidelity of the quantization process, the encoder can control the balance between the accuracy of the pixel representation, (in other words, the quality of the picture) and the size of the resulting encoded video representation (in other words, the file size or transmission bit rate). An example of the encoding process is depicted in FIG. 1.

The decoder reconstructs the output video by applying a prediction mechanism similar to that used by the encoder in order to form a predicted representation of the pixel blocks (using the motion or spatial information created by the encoder and stored in the compressed representation of the image) and prediction error decoding (the inverse operation of the prediction error coding to recover the quantized prediction error signal in the spatial domain).

After applying pixel prediction and error decoding processes the decoder combines the prediction and the prediction error signals (the pixel values) to form the output video frame.

The decoder (and encoder) may also apply additional filtering processes in order to improve the quality of the output video before passing it for display and/or storing as a prediction reference for the forthcoming frames in the video sequence. An example of the decoding process is depicted in FIG. 2.

In typical video codecs, the motion information is indicated by motion vectors associated with each motion compensated image block. Each of these motion vectors represents the displacement of the image block in the picture to be coded (in the encoder) or decoded (at the decoder) and the prediction source block in one of the previously coded or decoded images (or pictures). In order to represent motion vectors efficiently, motion vectors are typically coded differentially with respect to block specific predicted motion vector. In a typical video codec, the predicted motion vectors are created in a predefined way, for example by calculating the median of the encoded or decoded motion vectors of the adjacent blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize the Lagrangian cost function to find optimal coding modes, for example the desired macro block mode and associated motion vectors. This type of cost function uses a weighting factor or $\lambda$ to tie together the exact or estimated image distortion due to lossy coding methods and the exact or estimated amount of information required to represent the pixel values in an image area.

This may be represented by the equation:

$$C = D + \lambda R \tag{1}$$

where C is the Lagrangian cost to be minimised, D is the image distortion (in other words the mean-squared error) with the mode and motion vectors currently considered, and R is the number of bits needed to represent the required data to reconstruct the image block in the decoder (including the amount of data to represent the candidate motion vectors).

When source symbols are coded using code words which may have different lengths, the source symbols are translated to unique code words. This kind of coding can be called as a variable length coding (VLC). The coding may be designed so that more probable symbols are represented with shorter code words and less probable symbols are represented with longer code words. Shorter code words can be represented with less bits compared to longer code words when the code words are transmitted. One aim of the variable length coding is to reduce the amount of information needed to represent the symbols compared to the situation that the symbols were encoded as such. In other words, when a set of symbols is translated to code words, the resulting coded representation should contain fewer bits than the source. The set of symbols may include many kinds of information. For example, a set of symbols can be a file consisting of bytes, an information stream such as a video stream or an audio stream, an image, etc.

The design of variable length code words can depend on the probability statistics of the source of which the source symbols represent. To obtain a set of code words for variable length coding probability statistics can be gathered from some representative source material and the code words are designed around those statistics. This may work quite well, but in many cases statistics are not stationary and may vary in time and having fixed set of code words may not produce good compression. To achieve better compression, the set of variable length code words could be constantly adapted locally to observed statistics of the source.

One way of performing adaptation is to keep track of symbol frequencies and use the frequencies to define the set of variable length code words on-the-fly as the symbols are coded. This kind of full adaptation is quite complex operation, especially if the range of source symbols is large. In practical implementations, some form of suboptimal adaptation may be performed. For example, the encoder could use a number of predefined sets of variable length code words and select one set of them based on estimation of local statistics. In another implementation coder could gradually adapt the code words of the set so that only few of the individual code words of the set are changed at a time so that the complexity per coded code word is low.

SUMMARY

The present invention introduces a method for determining mapping between a syntax element and a code word for variable length coding. The determining of the mapping can be realized by using information of a hierarchy level in a tree structure. In some example embodiments the tree structure may include one or more of the following: a transform blocks, motion partition blocks, prediction blocks.

According to one example embodiment of the present invention there is provided a method for determining mapping between a syntax element and a code word for variable length coding. According to another example embodiment of the present invention there is provided a method for determining mapping between a syntax element and a code word for variable length decoding.

According to a first aspect of the invention there is a method comprising:
  receiving a syntax element to be encoded as a code word of a set of code words;
  determining a mapping between the syntax element and the code word on the basis of a hierarchy level in a tree structure;
  using the mapping to obtain the code word; and
  updating the mapping.

According to a second aspect of the present invention there is provided a method comprising:
  receiving a code word of a set of code words;
  determining a hierarchy level in a tree structure;
  determining a mapping to obtain a syntax element on the basis of said hierarchy level; and
  updating the mapping.

According to a third aspect of the present invention there is provided an apparatus comprising:
  an input configured for receiving a syntax element to be encoded as a code word of a set of code words;
  a determination element configured for determining a mapping between the syntax element and the code word on the basis of a hierarchy level in a tree structure;
  a code word selector configured for using the mapping to obtain the code word; and
  an adapter configured for updating the mapping.

According to a fourth aspect of the present invention there is provided an apparatus comprising:
  an input configured for receiving a code word of a set of code words;
  a determination element configured for determining a hierarchy level in a tree structure;
  a syntax element selector configured for determining a mapping to obtain a syntax element on the basis of said hierarchy level; and
  an adapter configured for updating the mapping.

The apparatus may comprise an encoder.
The apparatus may comprise a decoder.
An electronic device may comprise apparatus as featured above.
A chipset may comprise apparatus as featured above.

According to a fifth aspect of the present invention there is provided a storage medium having stored thereon a computer executable program code for use by an encoder, said program codes comprise instructions for:
  receiving a syntax element to be encoded as a code word of a set of code words;
  determining a mapping between the syntax element and the code word on the basis of a hierarchy level in a tree structure;
  using the mapping to obtain the code word; and
  updating the mapping.

According to a sixth aspect of the present invention there is provided a storage medium having stored thereon a computer executable program code for use by a decoder, said program codes comprise instructions for:
  receiving a code word of a set of code words;
  determining a hierarchy level in a tree structure;
  determining a mapping to obtain a syntax element on the basis of said hierarchy level; and
  updating the mapping.

According to a seventh aspect of the present invention there is provided an apparatus comprising:
  at least one processor;
  and at least one memory including computer program code;
  the at least one memory and the computer program code configured to, with the at least one processor, cause the apparatus at least to:
  receive a syntax element to be encoded as a code word of a set of code words;
  determine a mapping between the syntax element and the code word on the basis of a hierarchy level in a tree structure;
  use the mapping to obtain the code word; and
  update the mapping.

According to an eighth aspect of the present invention there is provided an apparatus comprising:
  at least one processor;
  and at least one memory including computer program code;
  the at least one memory and the computer program code configured to, with the at least one processor, cause the apparatus at least to:
  receive a code word of a set of code words;
  determine a hierarchy level in a tree structure;
  determine a mapping to obtain a syntax element on the basis of said hierarchy level; and
  update the mapping.

According to a ninth aspect of the present invention there is provided an apparatus comprising:
  means for receiving a syntax element to be encoded as a code word of a set of code words;
  means for determining a mapping between the syntax element and the code word on the basis of a hierarchy level in a tree structure;
  means for using the mapping to obtain the code word; and
  means for updating the mapping.

According to a tenth aspect of the present invention there is provided an apparatus comprising:
  means for receiving a code word of a set of code words;
  means for determining a hierarchy level in a tree structure;
  means for determining a mapping to obtain a syntax element on the basis of said hierarchy level; and
  means for updating the mapping.

In the conversion process from converting the value of a syntax element to binary form, transform size or other transform characteristic can be used as an input parameter. If the conversion process uses adaptive sorting tables, different sorting tables can be used for different transform sizes. The splitting of transforms in quad-tree structure may be coded as a group instead of coding them individually.

In some embodiments the already coded cbp values of higher or neighboring nodes in the quad-tree may be used in addition to the transform characteristics to determine the sorting table.

In some further embodiments converting the value of a syntax element to binary form can be done without using adaptive sorting tables. For example, different VLC tables can be used to code the coded block pattern values for different transform sizes. If context adaptive binary arithmetic coding (CABAC) or similar entropy coding method is used, the context selection for the coded block pattern values can be done based on the transform size.

DESCRIPTION OF THE DRAWINGS

FIG. 6b depicts as a tree diagram an example of a hierarchical structure of syntax elements of the macroblock of FIG. 6a;

DETAILED DESCRIPTION

Figure 8:
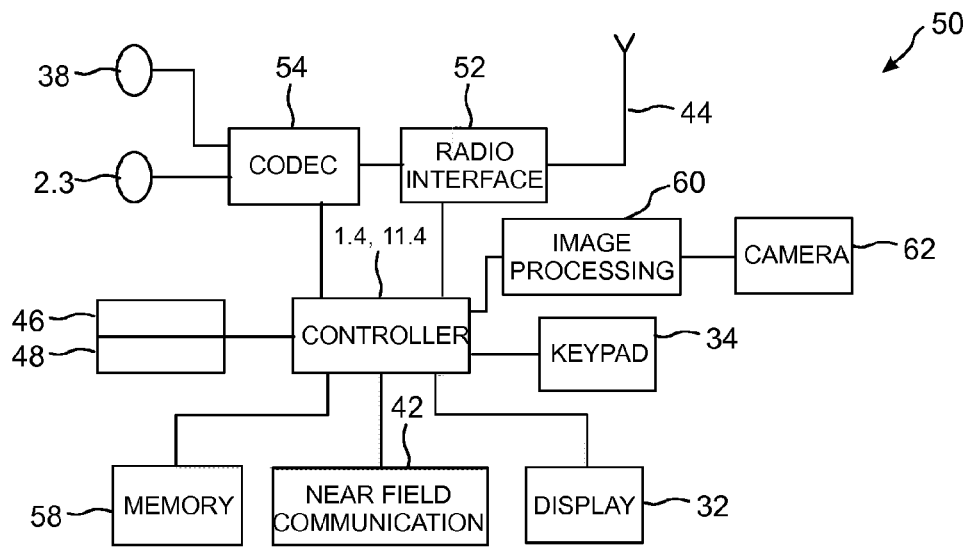
FIG. 8 shows schematically an electronic device employing some embodiments of the invention.
Figure 9:
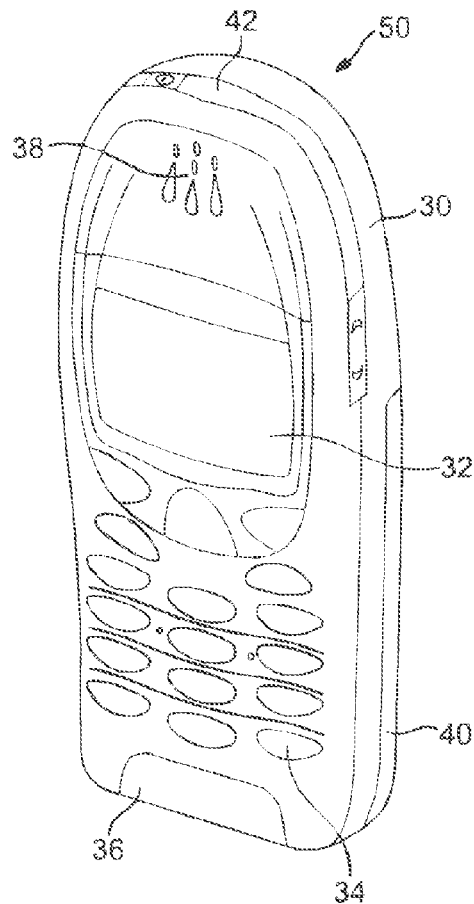
FIG. 9 shows schematically a user equipment suitable for employing some embodiments of the invention.

The following describes in further detail suitable apparatus and possible mechanisms for the provision of enhancing encoding efficiency and signal fidelity for a video codec. In this regard reference is first made to FIG. 8 which shows a schematic block diagram of an exemplary apparatus or electronic device 50, which may incorporate a codec according to an embodiment of the invention, and to FIG. 9, which shows schematically a user equipment suitable for employing some embodiments of the invention.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 2.3 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 1.4, 11.4 or processor for controlling the apparatus 50. The controller 1.4, 11.4 may be connected to memory 58 which in embodiments of the invention may store both data in the form of image and audio data and/or may also store instructions for implementation on the controller 1.4, 11.4. The controller 1.4, 11.4 may further be connected to codec circuitry 54 suitable for carrying out coding and decoding of audio and/or video data or assisting in coding and decoding carried out by the controller 1.4, 11.4.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In some embodiments of the invention, the apparatus may receive the video image data for processing from another device prior to transmission and/or storage. In some embodiments of the invention, the apparatus 50 may receive either wirelessly or by a wired connection the image for coding/decoding.

Figure 10:
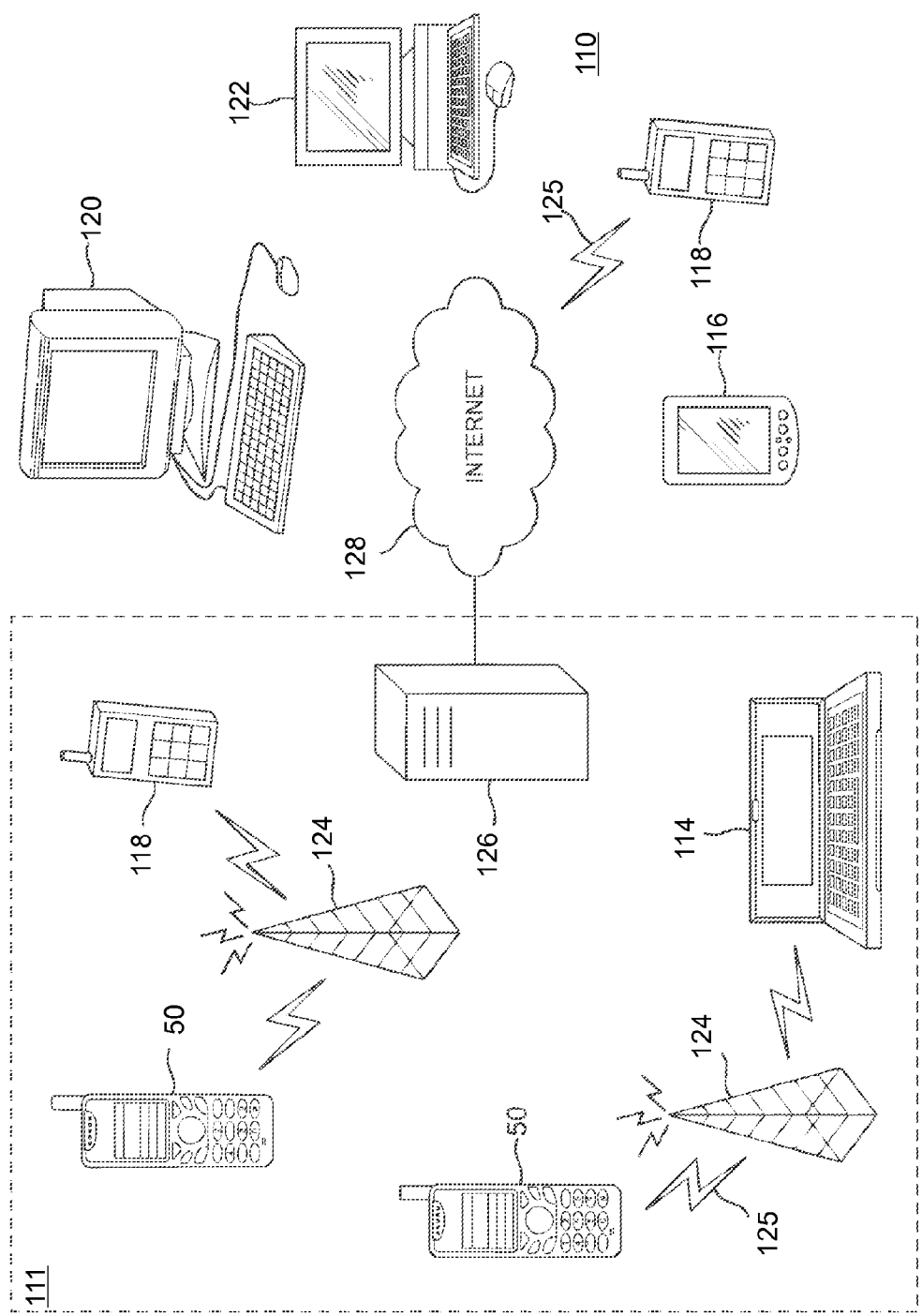
FIG. 10 further shows schematically electronic devices employing embodiments of the invention connected using wireless and wired network connections.

With respect to FIG. 10, an example of a system within which embodiments of the present invention can be utilized is shown. The system 110 comprises multiple communication devices which can communicate through one or more networks. The system 110 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 110 may include both wired and wireless communication devices or apparatus 50 suitable for implementing embodiments of the invention.

For example, the system shown in FIG. 10 shows a mobile telephone network 111 and a representation of the internet 128. Connectivity to the internet 128 may include, but is not limited to, long range wireless connections, short range wireless connections, and various wired connections including, but not limited to, telephone lines, cable lines, power lines, and similar communication pathways.

The example communication devices shown in the system 110 may include, but are not limited to, an electronic device or apparatus 50, a combination of a personal digital assistant (PDA) and a mobile telephone 114, a PDA 116, an integrated messaging device (IMD) 118, a desktop computer 120, a notebook computer 122. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 124. The base station 124 may be connected to a network server 126 that allows communication between the mobile telephone network 111 and the internet 128. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Figure 1:
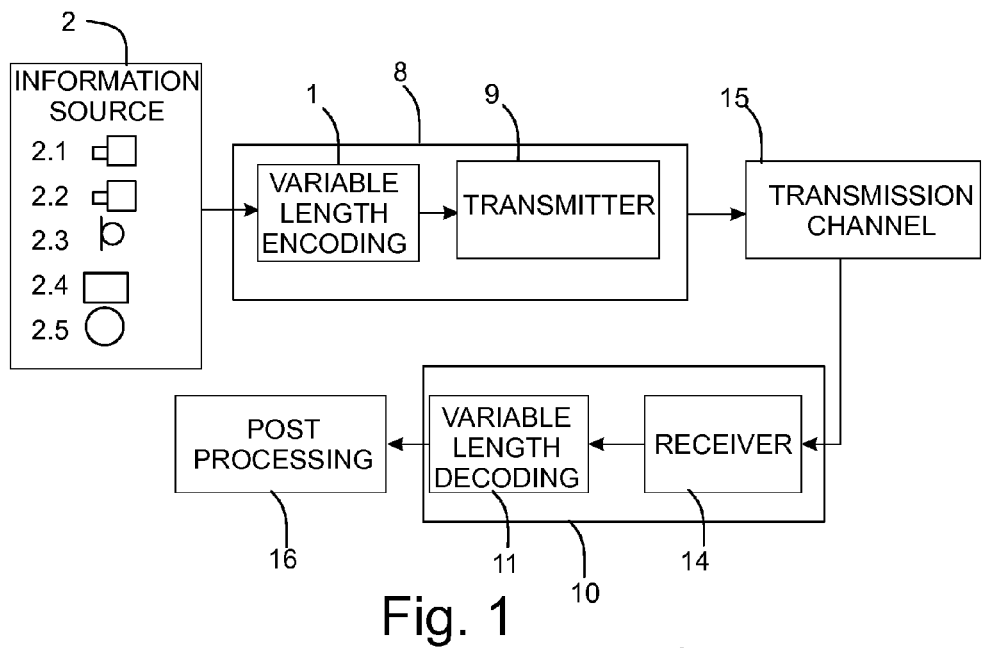
FIG. 1 depicts as a simplified block diagram an example embodiment of a system in which information is transmitted from an encoder to a decoder.

In the following the system of FIG. 1 will be described in more detail. The information to be encoded and transmitted is received by an encoder 1 from a source 2. The encoder may be a part of a codec of the user apparatus 50, or it may be a part of another apparatus or it may also be an apparatus of its own. The information can be e.g. video information, audio information, still images, text, etc. The information can also be a combination of two or more different kinds of information. Then, there may be provided different encoders and decoders for each type of information or the same encoder and/or decoder may process different kinds of information. The source 2 can be, for example, a video camera 2.1, a still camera 2.2, a microphone 2.3, a device 2.4 capable of playing back e.g. digital versatile disks (DVD), a storage medium 2.5, etc. The above examples of the information and the source 2 are only for illustrating the present invention, not for limiting the scope of the present invention. The information from the source 2 is encoded by an encoder 1 of the first device 8. The encoded information can be stored to a memory 4 and/or transmitted by a transmitter 9 to a transmission channel 15. The transmitted information can be received by a receiver 114 of a second device 10. The second device 10 comprises a decoder 11 which decodes the received information. The decoded information can be post-processed, for example, by storing the decoded information to a memory 12 of the second device, displayed by a display, if the information contains visual information, transformed to audio information, if the information contains audio information etc.

Figure 11:
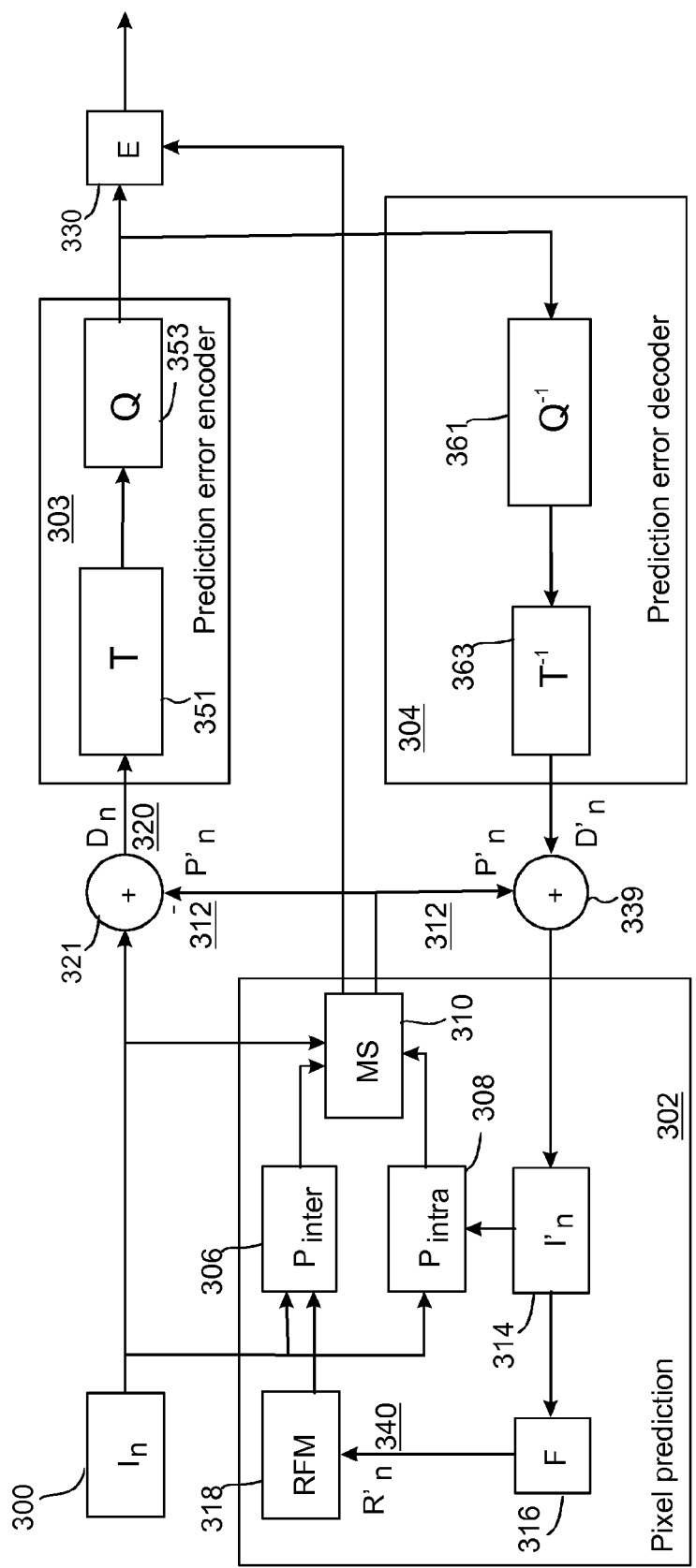
FIG. 11 shows schematically an embodiment of a video encoder.

With respect to FIG. 11, a block diagram of a video encoder suitable for carrying out encoding of a video information is shown.

FIG. 11 shows the encoder as comprising a pixel predictor 302, prediction error encoder 303 and prediction error decoder 304.

The pixel predictor 302 receives the image 300 to be encoded at both the inter-predictor 306 (which determines the difference between the image and a reference frame 318) and the intra-predictor 308 (which determines the image based only on the current frame or picture). The output of both the inter-predictor and the intra-predictor are passed to the mode selector 310. The mode selector 310 also receives a copy of the image 300. The output of the mode selector is the predicted representation of an image block 312 from either the intra-predictor 306 or intra-predictor 308 which is passed to a first summing device 321. The first summing device may subtract the pixel predictor 302 output from the image 300 to produce a first prediction error signal 320 which is input to the prediction error encoder 303.

The pixel predictor 302 further receives from a preliminary reconstructor 339 the combination of the prediction representation of the image block 312 and the output 338 of the prediction error decoder 304. The preliminary reconstructed image 314 may be passed to the intra-predictor 308 and to a filter 316. The filter 316 receiving the preliminary representation may filter the preliminary representation and output a final reconstructed image 340 which may be saved in a reference frame memory 318. The reference frame memory 318 may be connected to the inter-predictor 306 to be used as the reference image against which the image 300 is compared in inter-prediction operations.

The operation of the pixel predictor 302 may be configured to carry out any known pixel prediction algorithm known in the art.

The prediction error encoder 303 comprises a transform block 351 which performs a transform such as a discrete cosine transform (DCT), a discrete sine transform (DST), or a Karhunen-Loéve transform (KLT) to the coefficient values of the macroblocks. The prediction error encoder 303 also comprises a quantizer block 353 which performs a quantization operation on the coefficients. The output of the prediction error encoder 303 is passed to the entropy encoder 330 and also to the prediction error decoder 304.

The entropy encoder 330 receives the output of the prediction error encoder and may perform a suitable entropy encoding/variable length encoding on the signal to provide error detection and correction capability. The entropy encoder 330 may comprise the encoder 1.

The prediction error decoder 304 receives the output from the prediction error encoder 303 and performs the opposite processes of the prediction error encoder 303 to produce a decoded prediction error signal 338 which when combined with the prediction representation of the image block 312 at the second summing device 339 produces the preliminary reconstructed image 314.

Figure 2:
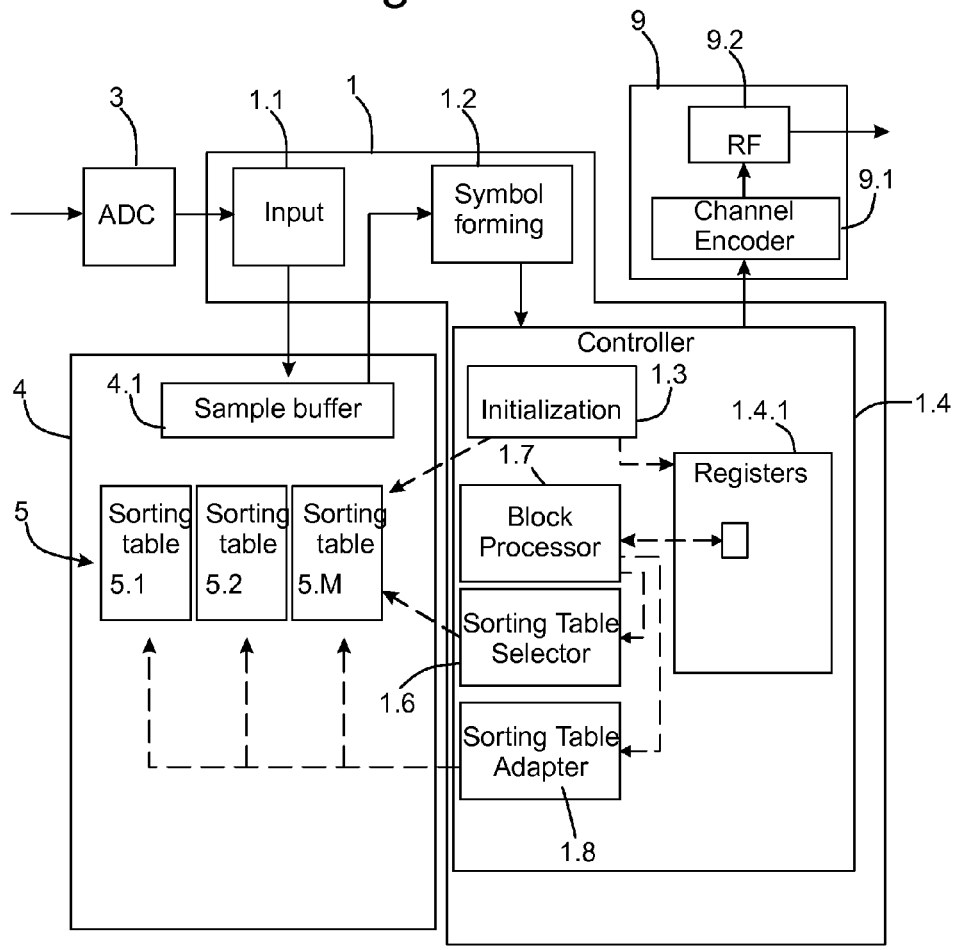
FIG. 2 depicts as a simplified block diagram an encoder according to an example embodiment of the present invention.

An example embodiment of the encoder 1 is depicted in FIG. 2. The encoder 1 has an input 1.1 to receive the information to be encoded. If the information is in analogue form it is converted to a digital form by e.g. the analog-to-digital converter 3. The analog-to-digital converter 3 forms samples on the basis of the analogue information. The samples represent the analogue signal at some time intervals. However, the information may already be in the form in which the encoder 1 can process it. Hence, the analog-to-digital converter 3 may not be needed. The samples may be stored to a sample buffer 4.1.

In the system of FIG. 11 the information from the prediction error encoder 303 to be encoded may be provided to the input 1.1 without using the analog-to-digital converter 3 as the quantized coefficients are already in digital form.

In the following, the information to be transmitted is assumed to be visual information. The visual information is provided to the pixel predictor 302, prediction error encoder 303 and prediction error decoder 304. As mentioned above, pixel prediction operations may be performed such as intra prediction or inter prediction, to form intra (I) pictures, predicted (P) pictures, and/or bidirectionally predicted (B) pictures. These pictures can be transformed into macroblocks. For example, the block processor 1.7 may use the following transform sizes: 4×4, 8×8, 16×16, 32×32, 64×64 and 128×128.

Figure 4:
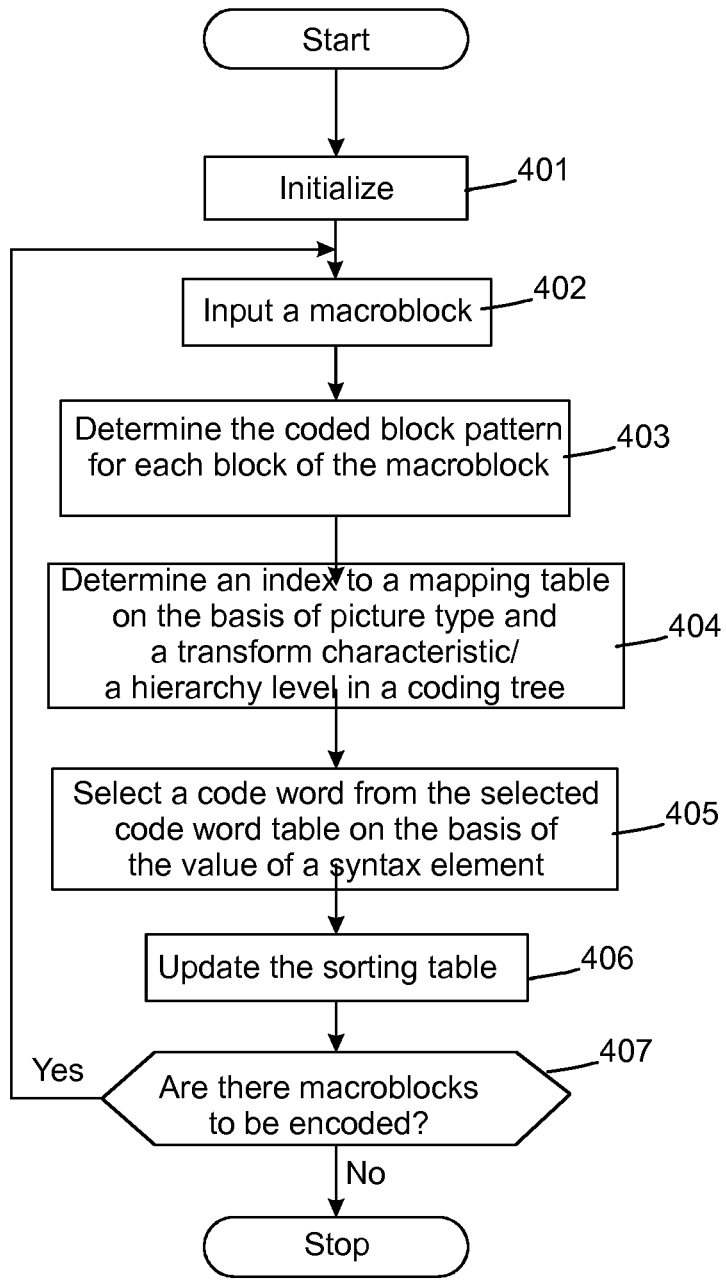
FIG. 4 depicts as a flow diagram an encoding method according to an example embodiment of the present invention.

Information to be transmitted is encoded by the encoder 1 to form code words. In the following the encoding process is described in more detail with reference to the flow diagram of FIG. 4 and to the encoder 1 of FIG. 2. It is assumed here that some statistical parameters can be estimated from the information to be encoded. For example, the probability distribution of symbols representing the information may be known or may be estimated by using some criteria. In the present invention two or more different sets of variable length code words are provided from which a variable length code words is selected for a symbol to be encoded. The sets of code words can be thought to form different variable length code word tables 5.1-5.M (VLC tables) in which rows represent mappings from a symbol to a code word. The variable length code word tables are also called as adaptive sorting tables in the specification, There are many possibilities to implement the code word tables in practical applications. This will be discussed in more detail later in the specification.

In some embodiments syntax elements can be coded by using an adaptive sorting table. This can be illustrated with the following non-limiting example. The operation of writing a value of a syntax element X into a bitstream could be performed as follows. It is assumed that the value of the syntax element is Y. In the beginning or at some restoration point a default table or one table among a set of default tables may be selected. It is also possible that a table is not defined in a memory of the device but an algorithm or a function may be used to determine values of elements of a table. For the sake of clarity of the explanation of the sorting operation, it is, however, assumed that the table is stored in a memory. The sorted table is maintained for some syntax elements for improved context adaptation. Let's denote the sorted table corresponding to syntax element X as a one dimensional array sorted table X[i]. The rank of the value Y in the sorted table X is first determined and that rank is coded using variable length coding (VLC). After that, the sorted table is updated so that the value Y will have a lower rank. This can be done by various was but one possible way is to swap the rank of the value Y with the value locating immediately above the value Y, which has the rank-1 i.e. the rank is one less than the rank of the value Y. The rank of the value corresponding the rank-1 is increased. In other words, the ranks of the value Y and the value above Y are switched.

In the above example a lowering the rank of the value Y means that the value Y is expected to appear more frequently than some other values. In some other embodiments the operation may be reversed i.e. increasing the rank may indicate an assumption that the value who's rank is increased appears more often than some other values wherein a shorter code word may be mapped for that value. In Table 1 the first alternative is used i.e. the value at the top of Table 1 has the lowest rank and the value at the bottom of Table 1 has the highest rank. Correspondingly, shorter code words can be assigned for values having lower ranks and longer code words can be assigned for values having higher ranks.

As an example the table X may contain the following values:

TABLE 1

| Syntax element | VLC code word |
|---|---|
| A | 1 |
| B | 010 |
| C | 011 |
| D | 00100 |

If the syntax element to be encoded were C, it would mean that the VLC code word would be 011. The sorting operation discussed above would result that the code words for syntax elements C and B were swapped after determining the code word for the syntax element C. Hence, the rearranged sorting table becomes:

TABLE 2

| Syntax element | VLC code word |
|---|---|
| A | 1 |
| C | 010 |
| B | 011 |
| D | 00100 |

Hence, if the syntax element C were encoded again, the code word 010 would be used to represent the syntax element C and the rank of the syntax element C would be amended again. In this example this would mean that the updated VLC code word for the syntax element C would be 1 and the updated VLC code word for the syntax element A would be 010 as is indicated in Table 3:

TABLE 3

| Syntax element | VLC code word |
|---|---|
| C | 1 |
| A | 010 |
| B | 011 |
| D | 00100 |

Figures 7A, 7B, 7C:
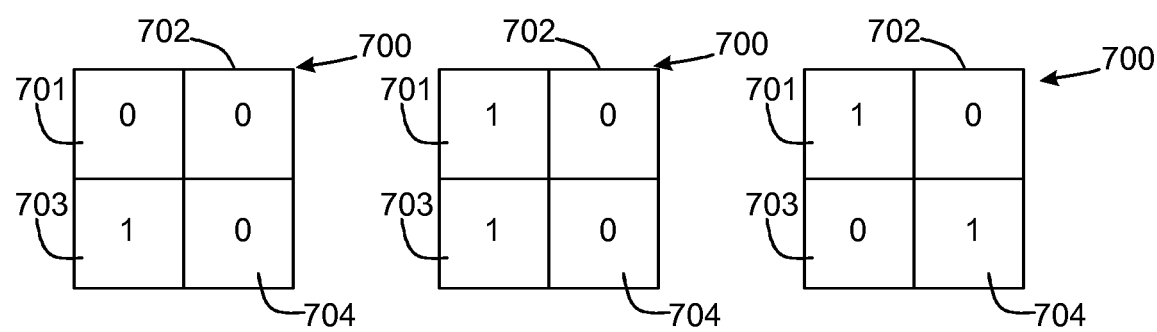
FIGS. 7a-7c depict some examples of macroblocks divided into four subblocks and corresponding coded block pattern values.

Video or other images may be encoded by blocks. For example, a macroblock of size N×N may be divided into four smaller blocks (subblocks) of size N/2×N/2. Some of the smaller blocks may only contain zero values whereas some other block(s) may contain one or more non-zero values. Coding efficiency might be improved if the encoder 1 did not need to encode the zero valued blocks but only provided an indication in the bitstream which blocks contain non-zero values (or which blocks contain zero values only). In some embodiments this is performed by forming a coded block pattern for a block which indicates which blocks contain at least one non-zero value (non-zero symbol). FIGS. 7a-7c depict some examples of macroblocks divided into four subblocks and corresponding coded block pattern values. In the example of FIG. 7a the lower-left block 703 of the macroblock 700 contains one or more non-zero values whereas the other three blocks 701, 702, 704 only contain zero values. The coded block pattern for the example of FIG. 7a may be presented as a binary value 0010. In the example of FIG. 7b the upper-left block 701 and the lower-left block 703 of the macroblock 700 contain one or more non-zero value whereas the other two blocks 702, 704 only contain zero values. The coded block pattern for the example of FIG. 7b may then be presented as a binary value 1010. Correspondingly, in the example of FIG. 7c the upper-left block 701 and the lower-right block 704 of the macroblock 700 contain one or more non-zero value whereas the other two blocks 702, 703 only contain zero values. The coded block pattern for the example of FIG. 7c may then be presented as a binary value 1001. In this example the binary number 1 indicated that a block contains non-zero value(s) and the binary number 0 indicated that a block only contains zero value(s). It is, however, possible to use different symbols or to use the binary number 1 to indicate a block with zero values only and to use the binary number 0 to indicate blocks having non-zero value(s).

The encoder 1 according to an example embodiment of the present invention performs the encoding as follows. In the beginning of the encoding some variables are initialized to their initial values. This is performed, for example, by the controller 1.4 of the encoder which sets some memory locations to a selected state. These memory locations can be located in the memory 4 or they can be internal to the controller 1.4, for example. In the example embodiment of FIG. 2 the variables are stored into the internal registers 1.4.1 of the controller 1.4. The initialization phase is depicted with block 401 in the flow diagram of FIG. 4 and with an initialization block 1.3 in FIG. 2.

In the initialization different adaptive sorting tables may be initialized to certain states. For example, mapping code values to code words may be arranged in an ascending order of code values, such as values from 0 to 15. Hence, the code value 0 is mapped to a first code word, the code value 1 is mapped to a second code word, etc.

After the initialization phase the encoding can be started and a macroblock can be input to the encoder 1 (block 402). The controller 1.4 may instruct a block processor 1.7 to determine a coded block pattern for the current macroblock (block 403). The controller 1.4 may also instruct the block processor 1.7 to determine a block partitioning for the current macroblock. The coded block pattern value, information on the block partitioning, and information on transform partitioning can be encoded by utilizing adaptive sorting tables 5.1, 5.2, . . . , 5.M. This is explained in more detail below.

In some embodiments the block processor 1.7 receives the coded block pattern, information on the block partitioning, and information on transform block sizes, information on macroblock size from the video encoder wherein block processor 1.7 need not determine the coded block pattern and/or the block partitioning.

An encoder 1 may insert in a bitstream an indication of subblocks of a macroblock which contain one or more non-zero values i.e. the above mentioned coded block pattern. The encoder 1 may receive the coded block pattern values for the macroblocks from the video encoder or the encoder 1 may determine the coded block pattern values.

In order to improve coding efficiency, different sorting tables may be used for the same syntax element, such as the coded block pattern, information on transform blocks, information on motion partitioning, depending on the context. For example, three different sorting tables may be used for each syntax element that is coded with the sorting table. These three sorting tables may be defined for each picture type (I picture, P picture and B picture). In other words, for the above example the sorting table can be given as a two dimensional array sorted table X[ctx][i] where the variable ctx identifies which sorting table is used and the variable i indicates the coded block pattern which should be encoded.

In the following it is assumed that the coded block pattern (cbp) information is coded using a sorted table CBP[ctx][i] 5.1. The context variable may be computed using the following information: picture type and the transform size of the current block (block 404). The encoder 1 may receive information on the picture type and/or the hierarchy level of the current block from the video encoder, for example from the mode selector 310 or the encoder 1 may determine them. The hierarchy level in a tree structure may refer to a coding tree for transform partitions, a coding tree for motion partitions or a coding tree related to block sizes. It should be noted here that the tree structure or a coding tree need not be actually implemented as certain elements or structures in a device but the tree structure or the coding tree may be illustrated as information on dependencies between different kinds of entities. In other words, there may be some hierarchical dependency rules between the entities. As a non-limiting example there could be a block having the size of 64×64 at a highest level of a tree structure. This level may also be called as a root of the tree structure or the coding tree and the levels below the root may be called nodes and the nodes at a certain hierarchy level may form a set of nodes. The block may be dividable to smaller blocks, e.g. to four 32×32 blocks which all can be thought to represent the next level of the tree structure (four nodes at the second level in this example). Each of these four 32×32 blocks may further be dividable to smaller blocks. e.g. to 16×16 blocks. These 16×16 blocks, the number of which could be between 0 and 16 (=four 32×32 blocks each divided to four smaller 16×16 blocks), could thought to represent the third hierarchy level of the tree structure (0 to 16 nodes at the third level in this example). It can also be mentioned that a term called a distance can be used in connection with hierarchy levels of the tree structure wherein elements of a certain hierarchy level has the same distance from the root. For example, the distance of the second hierarchy level is one from the root (where the root represents the first or the highest hierarchy level).

In the following examples the term coding tree is used as an example of the tree structure.

Table 4 illustrates an example mapping from picture type-transform size to ctx variable. This way, different sorting tables are maintained for different hierarchy levels in a coding tree which may improve the coding efficiency. This is because the values of syntax elements may be more correlated between the same hierarchy levels of a coding tree and separation of sorting tables exploits this correlation.

Table 4 illustrates an example of using the picture type and the hierarchy level of coding tree used for transform blocks as context.

TABLE 4

| Picture Type | Hierarchy level of a coding tree | ctx |
|---|---|---|
| I PICTURE | 0 | 0 |
|  | 1 | 1 |
|  | 2 | 2 |
|  | 3 | 3 |
| P PICTURE | 0 | 4 |
|  | 1 | 5 |
|  | 2 | 6 |
|  | 3 | 7 |
| B PICTURE | 0 | 8 |
|  | 1 | 9 |
|  | 2 | 10 |
|  | 3 | 11 |

For example, if the picture type is an intra picture (I picture) and the hierarchy level of the coding tree is 2, the corresponding context (index) would be 2 when Table 4 is used. Correspondingly, for a block with hierarchy level of 1 in a P picture the context would be 5.

For simplicity, in the following example it is assumed that the video encoder 1 supports four hierarchy levels (0, 1, 2, 3). The initial adaptive sorting table may be given as:

$$tableCBP[ctx][i] = \begin{cases} \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\} \end{cases}$$

in which the rows correspond with different picture types and hierarchy levels. In this example the rows correspond with the rows of Table 1, i.e. the first row corresponds with an I picture of size 4×4, the second row corresponds with an I picture of size 8×8, etc.

For example, if the encoder 1 is to code a coded block pattern (cbp) value of 10 which is 1010 in binary form indicating e.g. that the upper-left and lower-left blocks contain at least one non-zero coefficient. The encoder 1 determines the context variable ctx by using Table 4, for example. It is now assumed that the coded block pattern is coded in an I picture and the hierarchy level is 1. Hence, the context variable ctx can be determined to be 1 as can be seen from Table 4. The rank of value 10 is also 10 in the corresponding sorted table (tableCBP[ctx][i]) and the rank value can be binarized using a VLC table. Then, the corresponding ordered table is updated and the tableCBP array becomes:

$$tableCBP[ctx][i] = \begin{cases} \{0, 1, 2, 3, 4, 5, 6, 7, 8, 9, 10, 11, 12, 13, 14, 15\}, \\ \{0, 1, 2, 3, 4, 5, 6, 7, 8, 10, 9, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\} \end{cases}$$

In other words, the values 10 and 9 at the second row have been swapped.

It is now supposed that the encoder codes next a coded block pattern value of 3 in an I picture with hierarchy level being equal to 3. The ctx variable is found out to be 3 from Table 4. The rank of value 3 in the corresponding sorting table is 3, and the rank value 3 is binarized using a VLC table. Then the corresponding ordered table is updated and the tableCBP array becomes:

$$tableCBP[ctx][i] = \begin{cases} \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 3, 2, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\} \end{cases}$$

The values 3 and 2 at the fourth row have been swapped.

As seen above, it is possible to use a different adaptive sorting table for coded block pattern values at different transform sizes.

Next, some examples of VLC tables for encoding the rank value are illustrated.

TABLE 5

| Rank | VLC code word |
|---|---|
| 0 | 10 |
| 1 | 11 |
| 2 | 010 |
| 3 | 011 |
| 4 | 00100 |
| 5 | 00101 |
| 6 | 00110 |
| 7 | 00111 |
| 8 | 00010 |
| 9 | 00011 |
| 10 | 0000100 |
| 11 | 0000101 |
| 12 | 0000110 |
| 13 | 0000111 |
| 14 | 0000010 |
| 15 | 0000011 |

TABLE 6

| Rank | VLC code word |
|------|---------------|
| 0    | 1             |
| 1    | 010           |
| 2    | 011           |
| 3    | 00010         |
| 4    | 00011         |
| 5    | 00001000      |
| 6    | 00001001      |
| 7    | 00001010      |
| 8    | 00001100      |
| 9    | 00001101      |
| 10   | 00001110      |
| 11   | 00001111      |
| 12   | 00000100      |
| 13   | 00000101      |
| 14   | 00000110      |
| 15   | 00000111      |

Using the above example the VLC code word 0000100 would first be selected to encode the coded block pattern value of 10, if Table 5 were used, or the VLC code word 00001110, if Table 6 were used. When the coded block pattern value of 10 is to be encoded again, the update rank for the value 10 is 9 wherein the VLC word is 00011 (Table 5) or 00001101 (Table 6).

In the second example the encoder 1 codes a coded block pattern value of 3 in an I picture with hierarchy level being equal to 3. The ctx variable was found out to be 3 from Table 4 wherein the VLC code word would first be 011, if the Table 5 were used, or 00010, if the Table 6 were used. Next time the coded block pattern value of 3 would be binarized as 010 (Table 5) or as 011 (Table 6).

In the encoder 1 the sorting table selector 1.6 may calculate the index ctx to the adaptive sorting table CBP[ctx] [i] and select the correct row in the sorting table by using the index ctx. The sorting table selector 1.6 may then assign the code word from the table to be used to represent the current syntax element by using the value of the syntax element as a pointer to the row in the sorting table (block 405). The sorting table adapter 1.8 may use the same pointer to adapt the sorting table (block 406) as illustrated above e.g. by swapping values of two consecutive elements in the adaptive sorting table.

Figure 13:
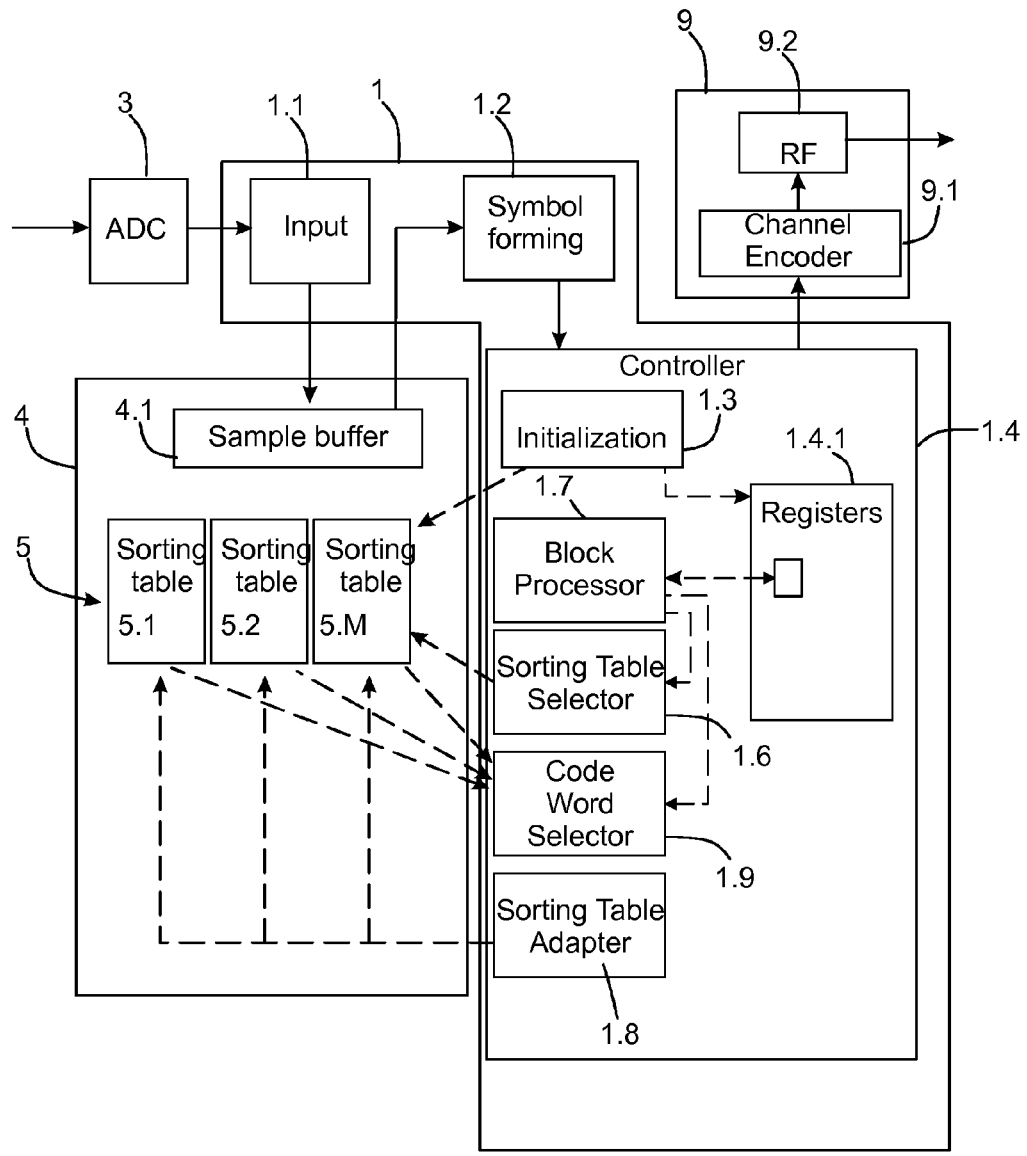
FIG. 13 depicts as a simplified block diagram an encoder according to another example embodiment of the present invention.

In another embodiment, illustrated in FIG. 13, the code word selection may be implemented by using a code word selector 1.9 which may receive information from the sorting table selector 1.6 on the selected sorting table. The code word selector 1.9 may then use the value of the syntax element to select the code word from the selected code word table.

The above procedures can be repeated for other macroblocks or other data to be encoded (block 407).

Figure 6A:
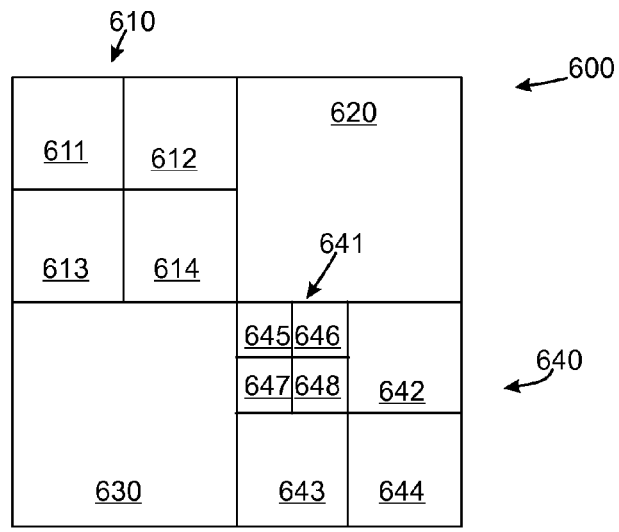
FIG. 6a depicts an example of a division of a macroblock into smaller blocks.
Figure 6B:
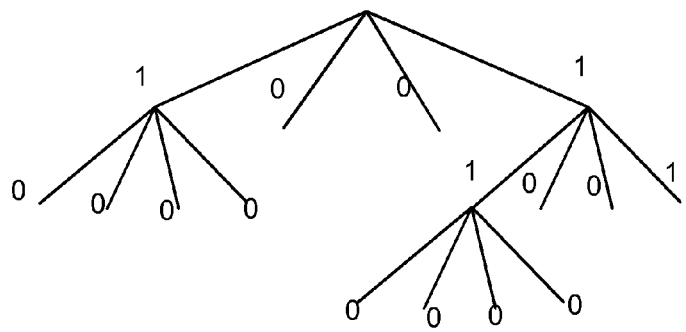
Figure 6C:
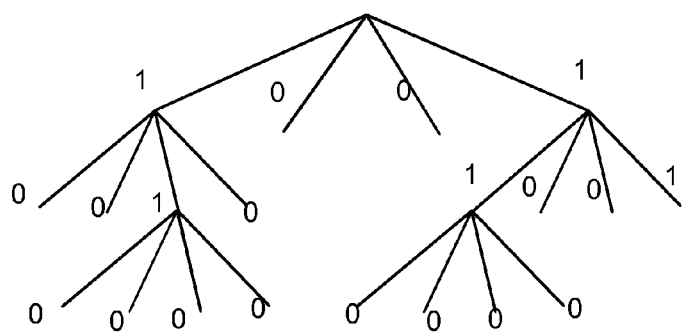
FIG. 6c depicts as a tree diagram another example of a hierarchical structure of syntax elements of a macroblock.

In some embodiments macroblocks can be partitioned into smaller blocks using a quad-tree partitioning, for example. An example of partitioning a macroblock into smaller blocks in a quad-tree manner is depicted in FIGS. 6a and 6b. FIG. 6a depicts an example of a macroblock 600 partitioned into smaller blocks 610, 620, 630, 640. In this example the upper-left block 610 is divided into four smaller blocks 611-614, the lower-right block 640 is divided into four smaller blocks 641-644, and the upper-left block 641 of the latter partitioned block 640 (i.e. the lower-right block of the large macroblock 600) is further divided into four smaller blocks 645-648. A quad-tree corresponding to the block partitioning of the example of FIG. 6a is illustrated in FIG. 6b. The quad-tree partitioning is a kind of a hierarchical transform. In some embodiments the quad tree can be coded e.g. by using binary numbers 1 and 0. For example, the number 1 may indicate that the block is divided into smaller blocks wherein the number 0 may indicate that the block is not divided into smaller blocks. This indication is called as a split flag indicating at each tree-node whether the transform should be splitted further. The quad-tree of the example of FIG. 6b could then be encoded as a set of binary values 1001, 0000, 1000, 0000. The first binary value 1001 represents the first (highest) level of the quad-tree indicating that the first (upper-left) and the last (lower-right) blocks are divided into smaller blocks. The next two binary values 0000 and 1000 represent the second (highest) level of the quad-tree, and the last binary value 0000 represents one part of the third (highest) level of the quad-tree. If some of the other blocks of the second level were divided into smaller blocks, the quad-tree would include at the third level more binary values. In other words, if a binary value at a certain level of the quad-tree includes a number 1, the binary representation of the quad-tree would contain a binary value at the next lower level. Another example of a quad-tree is illustrated in FIG. 6c. The corresponding binary representation of the quad-tree of FIG. 6c might be 1001, 0010, 1000, 0100, 0000, 0000. It should be noted here that the quad-tree may also be represented in a different way, for example in such a way that the binary number 1 may indicate that the block is not divided into smaller blocks wherein the number 0 may indicate that the block is divided into smaller blocks. Also other numbers or characters than the binary numbers 0 and 1 may be used to characterize the quad-tree structure.

From the above it can be concluded that partitioning of macroblocks of an image or a slice of an image can be indicated to a decoder by using quad-trees. Therefore, the encoder 1 may insert an indication of the partitioning of a macroblock into a bitstream by encoding the binary representation of the quad-tree. In the following an example implementation of encoding the binary representation is disclosed.

In some embodiments a macroblock can have a large size (e.g. 128×128 or even larger than that) and can be divided into smaller blocks in the quad-tree manner. The block processor 1.7 of the video encoder, or in some other embodiments the encoder 1 may examine the contents of the large macroblock and on the basis of the examination may decide to use smaller block sizes for certain areas of the macroblock. The decision may depend on the smoothness of the image contents, the number of details in the area of the macroblock etc.

When the encoder 1 has received information or determined the partitioning of a macroblock the encoder 1 may encode information on the partitioning e.g. as follows. This information is called as a transform structure information in this context. It should be noted that, in addition to transform structure, similar quad-tree as explained below could be used for block sizes, motion partitions.

In some embodiments a block need not be divided into four smaller blocks of the same size. For example, a M×M block may be divided to two (M/2)×M blocks or two M×(M/2) blocks. It may also be possible to divide the M×M block to blocks having different sizes. For example, it may be divided to one block of size (M−N)×M and another block of size N×M, to one block of size M×(M−N) and another block of size M×N, etc. It may also be possible to divide a block to four smaller blocks which need not be the same size. For example, an M×M block may be dividable to one N×N block, one (M−N)×(M−N) block, one (M−N)×N block and one N×(M−N) block. The above mentioned parameters M, N are positive integers. In some embodiments these kind of block sizes may be used to represent motion partition blocks and the syntax element may then relate to motion partition information.

Using 1-bit syntax elements may not be coded efficiently using VLC coding, so it may be better to group the syntax elements. A syntax element called transform split pattern (tsp) is used that indicates which one of the four transform blocks are split further. The tsp syntax element may then be coded using adaptive sorting table, similar to the coded block pattern illustrated above.

It is now assumed that the tsp information is coded using sorted table TSP[ctx][i]. Similar to the coded block pattern coding, the context variable is computed using the following information: the picture type and the transform size of the current block.

For simplicity, in the following example it is again assumed that the video encoder 1 supports transforms of sizes 4×4, 8×8, 16×16 and 3202. In this example, the 32×32 transform size refers to transform coding tree hierarchy level 0, 16×16 refers to hierarchy level 1 and so on. The initial adaptive sorting table for the tsp information may be given as:

$$tableTSP[ctx][i] = \begin{Bmatrix} \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\} \end{Bmatrix}$$

in which the rows correspond with different picture types and block sizes. In this example the rows correspond with the rows of Table 1, i.e. the first row corresponds with I picture of size 4×4, the second row corresponds with I picture of size 8×8, etc.

In the example of FIGS. 6a and 6b the node at the top of the quad-tree corresponds with the size of an unsplitted macroblock. In this case the size is 128×128 picture elements but it can be different from that. That node need not be encoded. The first level (highest in the FIG. 6b) which may have tsp information is the level below the top node, i.e. the four branches from the top node. This level corresponds with the block size 128/2×128/2=64×64. Hence, if the tsp value 9 (=1001 as a binary number) were to be encoded, Table 4 would indicate that the index ctx were 3, if the macroblock is a macroblock of an I picture, 7, if the macroblock is a macroblock of a P picture, or 11, if the macroblock is a macroblock of a B picture.

If the macroblock belongs to a P picture, the VLC code word could be selected from the eighth row of the table TSP[ctx][i]. The value is 9 so the tenth VLC code word from the eighth row were selected and the rank of the tenth row were amended, e.g. by decreasing the rank by 1. Hence, the table TSP[ctx][i] were amended as follows $$tableTSP[ctx][i] = \begin{Bmatrix} \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 9, 8, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\}, \\ \{0, 1, 2, 3, 4, 5, 6, 7, 8, 9, 10, 11, 12, 13, 14, 15\} \end{Bmatrix}$$

In the same way the tsp values for lower levels (smaller block sizes such as 16×16, 8×8, 4×4) of the quad-tree can be binarized.

In some embodiments the whole quad-tree need not always be encoded. For example, some of the lower levels may contain zero values e.g. when no parts of the large macroblock is partitioned into smallest possible block sizes. For example, a macroblock of size 128×128 may have been divided into subblocks of 64×64 picture elements and these subblocks or only part of them may have further been divided into subblocks of 32×32 picture elements and no further division has been made. In this example, it might suffice if only the tsp values of the first and second level were encoded.

The encoder 1 may insert in the bitstream an indication which parameters have been encoded. For example, an indication may be provided that certain VLC code words represent the values of coded block patterns or the values of the transform split pattern, for example. This information may also be provided by using other means or these VLC code words may be located in certain locations of a bit stream, for example.

The design of the sorting tables and the code word tables 5.1-5.M can be application specific, e.g. there is not necessarily a single set of tables that works for every use case. However, Tables 1-6 above illustrate one possible table design that might be used.

In some embodiments the sorting tables and the code word tables are not separate tables but they are combined. In other words, using Tables 4 and 5 the table CBP[ctx][i] could be implemented in a memory of a device so that a certain memory area is reserved for each possible value of the variable ctx i.e. for each row of the table, and this area contains the code words for each possible value of the variable i of that row. When the rank of a value Y is to be changed the code word corresponding to the current rank of the value Y could be swapped with the code word corresponding to the rank of another value Z with which the rank of the value Y should be changed. Using Table 5 as an example a part of the memory area reserved for the table CBP[ctx][i] could initially contain values 10, 11, 010, 011, 00100, 00101, . . . . In a situation in which the value 3 is to be encoded the encoder 1 would assign the code word 011 to represent the value 3 and exchange the code words 010 and 011. After that the above referred part of the memory would contain the following values 10, 11, 011, 010, 00100, 00101, . . . . There are also other possibilities to implement the sorting tables and code words and the mapping between them.

Also, in the previous examples, the code word was loaded from a pre-defined table that resides in the memory 4, for example. However, in some cases it is possible to generate the code word on-the-fly so that code words do not need to be stored in the memory. When the encoder needs to get a code word it uses the table number and the code word number to generate the code word using a predefined algorithm.

The storage of the code word tables 5.1-5.M and the adaptive sorting tables can be implemented in many ways. They can be stored e.g. to the memory 4 of the first device 8. Each row can be stored in consecutive memory locations so that each value has a certain length of bits or so that after each value there is a field separator to separate different columns from each other. It is also possible to store the values of the tables column-by-column.

Figure 3:
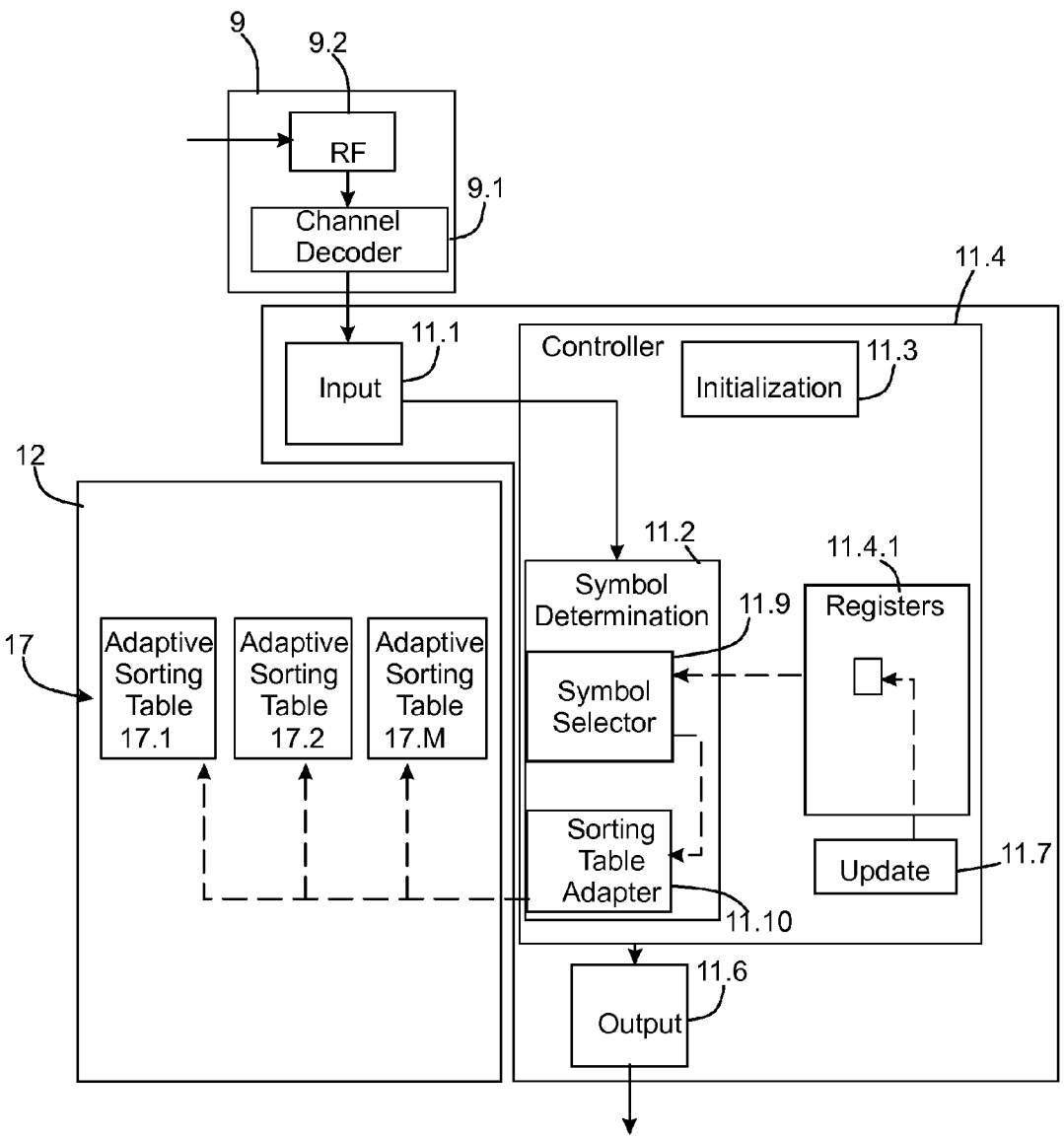
FIG. 3 depicts as a simplified block diagram a decoder according to an example embodiment of the present invention.
Figure 5:
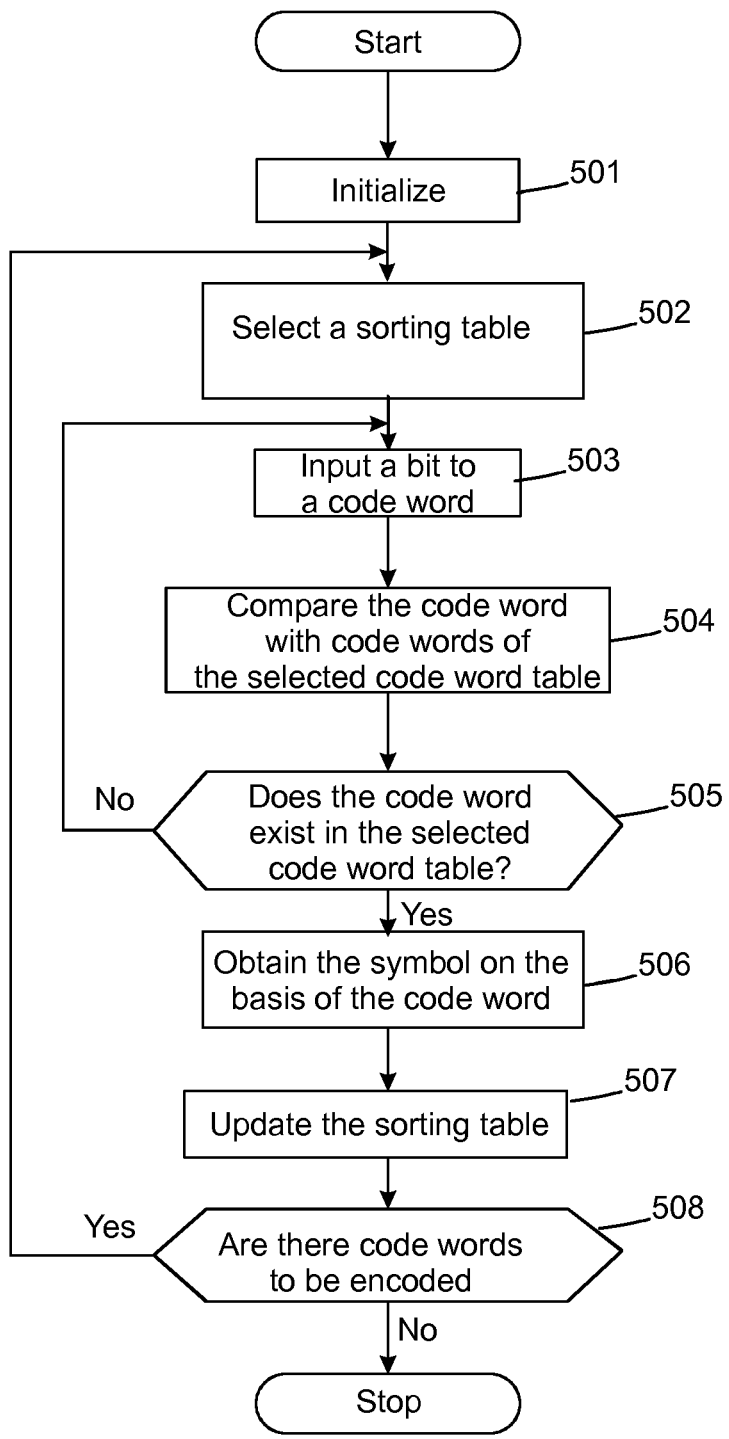
FIG. 5 depicts as a flow diagram a decoding method according to an example embodiment of the present invention.

In the above some principles of the present invention were discussed from the encoder point of view, but decoder implementation is quite similar except that the processing is reversed i.e. the received code word is used to determine the corresponding symbol. This is now explained in more detail with reference to the decoder of FIG. 3 and the flow diagram of FIG. 5. The second device 10 (FIG. 1) receives the transmitted information and performs in the receiver 14 e.g. conversion 14.1 of a radio frequency signal to a lower frequency signal (for example to a base band signal), channel decodes 14.2 the lower frequency signal and/or some other operations to obtain code words from the received signal. The received code words can be stored in the memory 12 of the second device for further processing.

The second device 10 or the decoder 11 includes the tables corresponding the tables the encoder 1 uses when encoding the coded block pattern and/or the transform split pattern, or the tables may be provided to the decoder 11 in another way, for example by transmitting them from the first device to the second device, or by downloading them from a storage medium, from a server, etc.

An initialization block 11.3 of a decoder 11 initializes (block 501 in FIG. 5) the adaptive sorting tables to an initial state which corresponds with the initial state of the adaptive sorting tables at the encoder 1. The decoder 11 has access to tables corresponding the tables of the encoder. For example, the decoder 11 has a similar set of adaptive sorting tables 17.1-17.M than the adaptive sorting tables 5.1-5.M of the encoder 1. The tables can be formed e.g. in the memory 12 of the decoder or the decoder 11 can comprise some algorithms to use instead of the tables.

The decoder 11 may comprise a variable k which indicates the type of the code word, for example if the code word relates to the coded block pattern information, to the transform split pattern information, or if the code word includes information on a coefficient of a block, etc. There may also be other was to separate different types of code words from each other by the decoder 11.

The symbol determination block 11.2 may use the current value of the variable k to determine which adaptive sorting table to use (block 502) or there may be a sorting table selector 11.9 for the selection of the adaptive sorting table. For example, if the variable k indicates that the current code word relates to the coded block pattern information, the symbol determination block 11.2 or the sorting table selector 11.9 uses information on the picture type and transform size to select the correct row of the coded block pattern table CBP[ctx][i] and uses the code word to select the correct element in that row.

The received bits are input e.g. one by one or in larger parts to the input 11.1 of the decoder 11 from which the bits are delivered to the symbol determination block 11.2 (block 503). The symbol determination block 11.2 examines the code words of the adaptive sorting table 17.1, 17.2, 17.M to determine whether such a code word exists in the adaptive sorting table (blocks 504, 505). If the examination indicates that the code word exists, the code word thus obtained can be used to determine the symbol i.e. the coded block pattern value (block 506). However, if the bit pattern so far decoded is not a code word in the code word table, the next bit is also input and combined with the previous bit(s). When an existing code word has been found, it can be used to determine the correct coded block pattern value. The coded block pattern value can also be stored e.g. to the memory 12 of the second device 10. The symbol determination block 11.2 can comprise a symbol selector 11.8 for performing the examination of the code words and corresponding symbols in the adaptive sorting tables. After finding the code word from the input bit stream and the corresponding coded block pattern value, the coded block pattern table CBP[ctx][i] can be updated e.g. by an adapter 11.6 by increasing the rank of the coded block pattern value as was disclosed in connection with the operation of the encoder (block 507). In case of decoding code words relating to the transform split pattern values the operation is quite similar to above with the exception that the table to be used is the transform split pattern table TSP[ctx][i] corresponding with the transform split pattern table TSP[ctx][i] of the encoder.

Figure 14:
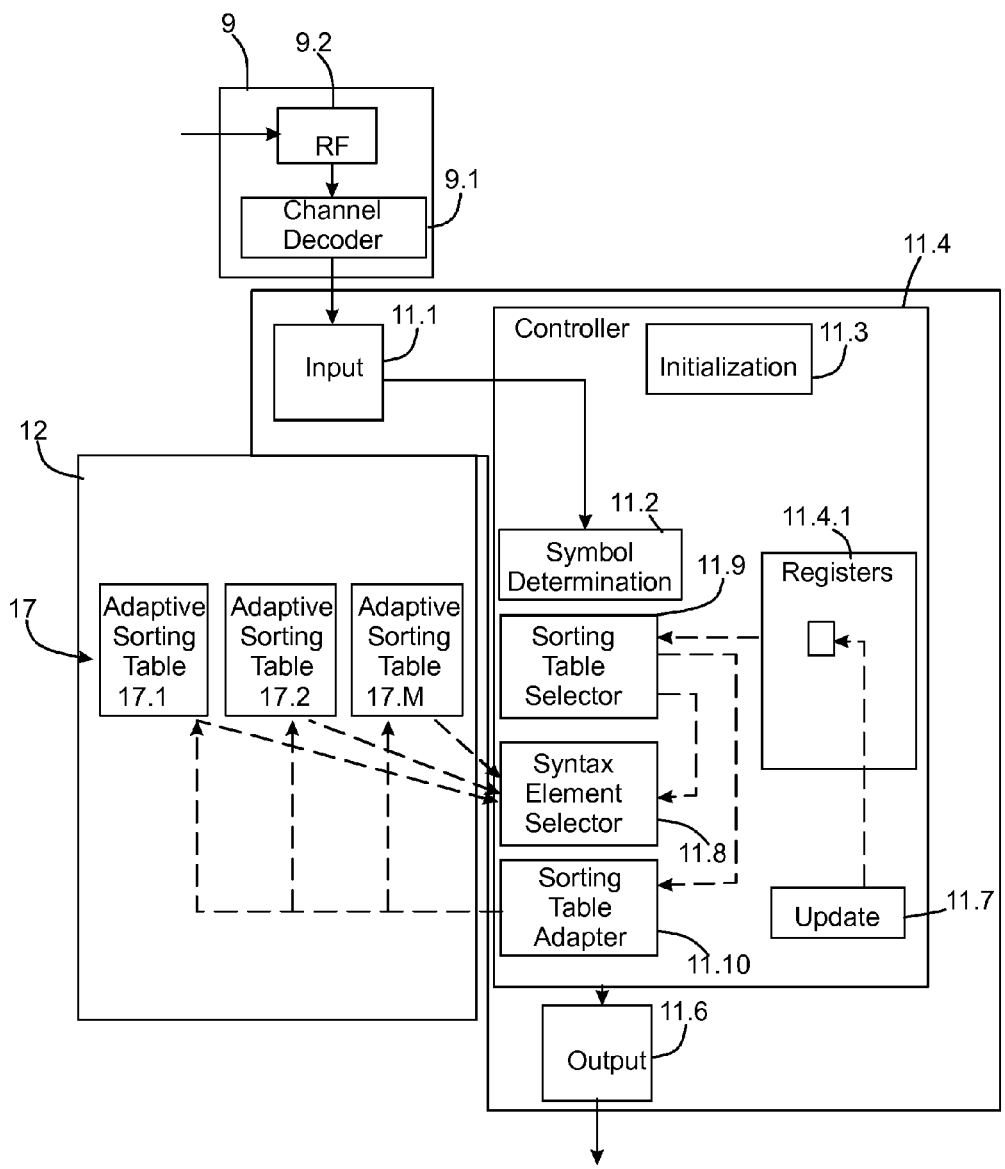
FIG. 14 depicts as a simplified block diagram a decoder according to another example embodiment of the present invention.

In some embodiments, as illustrated in FIG. 14, the decoder 11 may comprise a syntax element selector 11.8 which may use the code word to select the correct syntax element in the selected row of the selected sorting table, and an adapter 11.10 for adapting the selected sorting table.

The controller 11.4 can comprise an update element 11.7 for updating the adaptive sorting tables and possibly some other variables.

It should be noted here that there are also other possibilities to decode the symbol from the code word. It need not happen bit by bit but any kind of method of finding the matching codeword can be utilized in this context. For example, a part of the bit stream is input to the input 11.1 of the decoder 11 from which the bits are delivered to the symbol determination block 11.2. The symbol determination block 11.2 examines from the selected variable length code word table if said part of the bit stream comprises a code word in said selected variable length code word table. If the examination indicates that said part of the bit stream comprises a code word in said selected variable length code word table, the symbol determination block 11.2 determines which symbol in said selected variable length code word table corresponds with the code word, and outputs the symbol. If the examination indicates that said part of the bit stream does not comprise any code word in said selected variable length code word table, a next part of the bit stream is input to the input 11.1 of the decoder 11 and delivered to the symbol determination block 11.2 for further examination. The above steps are repeated until a valid code word has been found from the selected variable length code word table.

When the code word and a corresponding syntax element has been found, the syntax element may be provided to further processing by the output 11.6 of the decoder 11. The further processing may include storing the syntax element, reconstructing a block of a image or a whole image, etc.

There are also other possibilities to find matching code words in the decoding process such as using look-up tables or using binary tree.

By repeating the process the bit stream is correctly decoded resulting the same symbol stream which was transmitted.

Figure 12:
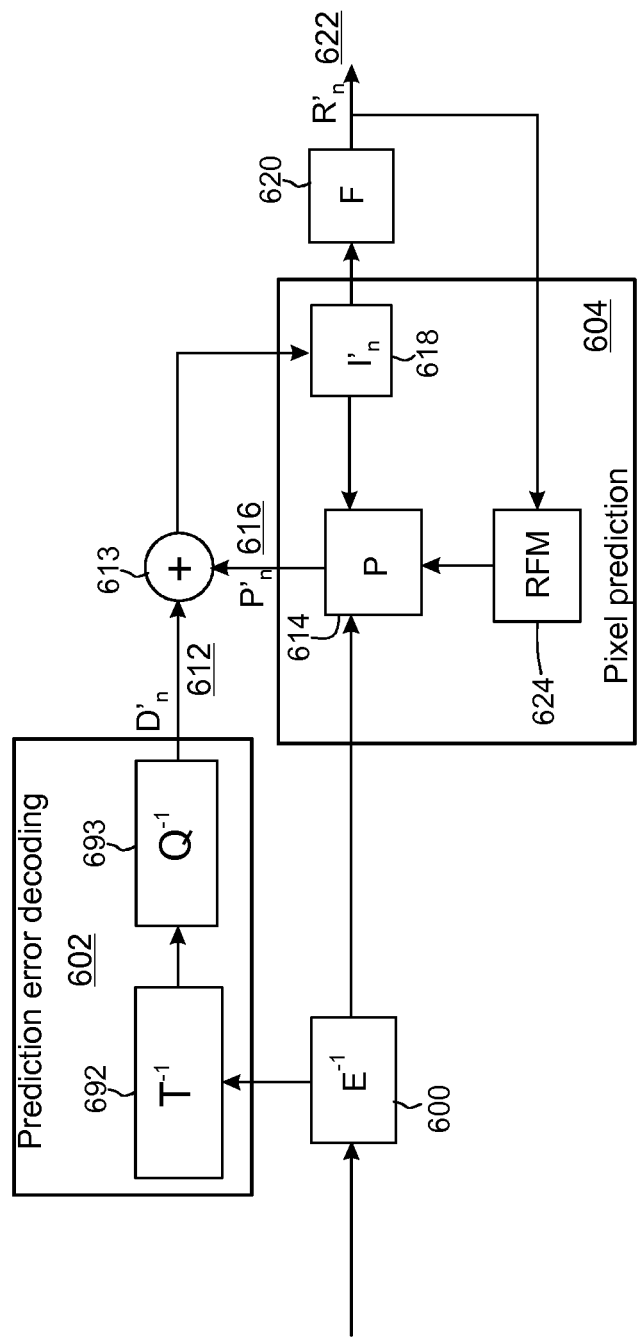
FIG. 12 shows a schematic diagram of an embodiment of a video decoder.

FIG. 12 shows a block diagram of a video decoder suitable for decoding macroblocks and reconstructing video e.g. for displaying, for storing or for further processing. The video decoder shows an entropy decoder 600 which performs an entropy decoding on the received signal and may comprise the decoder 11 described above. The entropy decoder thus performs the inverse operation to the entropy encoder 330 of the encoder described above. The entropy decoder 600 outputs the results of the entropy decoding to a prediction error decoder 602 and pixel predictor 604.

The pixel predictor 604 receives the output of the entropy decoder 600 and a predictor selector 614 within the pixel predictor 604 determines that either an intra-prediction or an inter-prediction operation is to be carried out. The predictor selector furthermore outputs a predicted representation of an image block 616 to a first combiner 613. The predicted representation of the image block 616 is used in conjunction with the reconstructed prediction error signal 612 to generate a preliminary reconstructed image 618. The preliminary reconstructed image 618 may be used in the predictor 614 or may be passed to a filter 620. The filter 620 applies a filtering which outputs a final predicted signal 622. The final predicted signal 622 may be stored in a reference frame memory 624, the reference frame memory 624 further being connected to the predictor 614 for prediction operations.

The prediction error decoder 602 receives the output of the entropy decoder 600 and performs inverse transformation by the inverse transformation block 692 and inverse quantization by the inverse quantizer 693 to obtain the reconstructed prediction error signal 612.

In the above examples the functional elements of the encoder 1 and the decoder 11 were depicted as separate blocks. However, in practical implementations the functional elements or some of them can be implemented in hardware or as a program code of the controller 1.4 of the encoder 1 and/or the controller 11.4 of the decoder 11. The controllers 1.4, 11.4 can be digital signal processors or other processors comprising program code interpreter or other means for executing program code. The program code can be stored into a storage medium such as the memory 4, 12 or into a disk e.g. a CDROM, or to another kind of a carrier.

The invention can be used in applications that use data compression, for example to compress video signals. In video coding, it has been observed that the method is beneficial for coding at least a macroblock mode, a coded block pattern (cbp) and position of the last non-zero coefficient in discrete cosine transform (DCT) transformed block.

The present invention can also be utilized in encoding information on the position of the last non-zero coefficient in discrete cosine transform (DCT) transformed block. The VLC code word may then be selected n the basis of an adaptive sorting table depending on e.g. the picture type and the transform size of the current block.

The first device 8 comprising the encoder 1 can be, for example, a wireless communication device, a computer, a server, a CDROM player, a DVD player, etc. The second device 10 comprising the decoder 11 can be, for example, a wireless communication device, a computer, a server, a CDROM player, a DVD player, etc. The transmission channel 15 can comprise a communication network such as a wireless communication network, a local area network, a wired or a wireless connection between the first device 9 and the second device 10, etc.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above.

It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi core processor architecture, as non limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

A method according to a first embodiment comprises:
  receiving a syntax element to be encoded as a code word of a set of code words;
  determining a mapping between the syntax element and the code word on the basis of a hierarchy level in a tree structure;
  using the mapping to obtain the code word; and
  updating the mapping.

In the method of the first embodiment of the invention the tree structure may be a coding tree.

In the method of the first embodiment of the invention the coding tree may comprise a quad-tree.

The method of the first embodiment of the invention may comprise using a sorting table to define the mapping.

In the method of the first embodiment of the invention said updating the mapping may comprise updating the sorting table.

The method of the first embodiment of the invention may comprise updating the mapping by swapping two values in the sorting table.

The method of the first embodiment of the invention may comprise using at least two sorting tables, wherein the method further comprises using the hierarchy level to select a sorting table from said at least two sorting tables.

The method of the first embodiment of the invention may comprise using at least two sorting tables each comprising a set of code words, wherein the method further comprises
  using the hierarchy level to select a sorting table from said at least two sorting tables; and
  using said syntax element to select the code word.

The method of the first embodiment of the invention may comprise using at least two sorting tables each comprising a set of code words, wherein the method further comprises
  using the hierarchy level to select a sorting table from said at least two sorting tables;
  using said syntax element to select the code word; and
  swapping the code word with another code word of said set of code words in the selected sorting table.

In the method of the first embodiment of the invention the hierarchy level may correspond with a set of nodes that has the same distance from a root of the tree structure.

In the method of the first embodiment of the invention the tree structure may relate to at least one of the following:
  a transform size;
  a prediction block size; or
  a macroblock size.

In the method of the first embodiment of the invention the syntax element may relate to one of
  a coded block pattern;
  a transform split pattern;
  a motion partition information.

A method according to a second embodiment comprises:
  receiving a code word of a set of code words;
  determining a hierarchy level in a tree structure;
  determining a mapping to obtain a syntax element on the basis of said hierarchy level; and
  updating the mapping.

In the method of the second embodiment of the invention the tree structure may be a coding tree.

In the method of the second embodiment of the invention the coding tree may be a quad tree.

In the method of the second embodiment of the invention said determining may comprise obtaining a syntax element from the determined sorting table on the basis of the code word.

The method of the second embodiment of the invention may comprise using a sorting table to define the mapping.

In the method of the second embodiment of the invention said updating the mapping may comprise updating the sorting table.

The method of the second embodiment of the invention may comprise updating the mapping by swapping two values in the sorting table.

The method of the second embodiment of the invention may comprise using at least two sorting tables, wherein the method further comprises using the hierarchy level to select a sorting table from said at least two sorting tables.

The method of the second embodiment of the invention may comprise using at least two sorting tables each comprising a set of code words and a set of syntax elements, wherein the method further comprises
  using the hierarchy level to select a sorting table from said at least two sorting tables; and
  using said code word to select the syntax element.

The method of the second embodiment of the invention may comprise using at least two sorting tables each comprising a set of code words and a set of syntax elements, wherein the method further comprises
  using the hierarchy level to select a sorting table from said at least two sorting tables;
  using said code word to select the syntax element; and
  swapping the syntax element with another syntax element of said set of syntax elements in the selected sorting table.

In the method of the second embodiment of the invention the hierarchy level may correspond with a set of nodes that has the same distance from a root of the tree structure.

In the method of the second embodiment of the invention the tree structure may relate to at least one of the following:
  a transform size;
  a prediction block size; or
  a macroblock size.

In the method of the second embodiment of the invention the syntax element may relate to one of:
  a coded block pattern;
  a transform split pattern;
  a motion partition information.

An apparatus according to a third embodiment comprises:
  an input configured for receiving a syntax element to be encoded as a code word of a set of code words;
  a determination element configured for determining a mapping between the syntax element and the code word on the basis of a hierarchy level in a tree structure;
  a code word selector configured for using the mapping to obtain the code word; and
  an adapter configured for updating the mapping.

In the apparatus of the third embodiment of the invention the tree structure may be a coding tree.

In the apparatus of the third embodiment of the invention the coding tree may comprise a quad-tree.

The apparatus of the third embodiment of the invention may comprise a sorting table to define the mapping.

In the apparatus of the third embodiment of the invention said adapter may be configured for updating the sorting table.

The apparatus of the third embodiment of the invention said adapter may be configured for swapping two values in the sorting table.

The apparatus of the third embodiment of the invention may comprise at least two sorting tables, wherein the apparatus may further comprise a sorting table selector configured for using the hierarchy level to select a sorting table from said at least two sorting tables.

The apparatus of the third embodiment of the invention may comprise at least two sorting tables each comprising a set of code words, wherein said sorting table selector may be configured for using the hierarchy level to select a sorting table from said at least two sorting tables; and said code word selector may be configured for using said syntax element to select the code word.

The apparatus of the third embodiment of the invention may comprise at least two sorting tables each comprising a set of code words, wherein said sorting table selector may be configured for using the hierarchy level to select a sorting table from said at least two sorting tables; said code word selector may be configured for using said syntax element to select the code word; and said adapter may be configured for swapping the code word with another code word of said set of code words in the selected sorting table.

In the apparatus of the third embodiment of the invention the hierarchy level may correspond with a set of nodes that has the same distance from a root of the tree structure.

In the apparatus of the third embodiment of the invention the tree structure may relate to at least one of the following:
 a transform size;
 a prediction block size; or
 a macroblock size.

In the apparatus of the third embodiment of the invention the syntax element may relate to one of:
 a coded block pattern;
 a transform split pattern;
 a motion partition information.

An apparatus according to a fourth embodiment comprises:
 an input configured for receiving a code word of a set of code words;
 a determination element configured for determining a hierarchy level in a tree structure;
 a syntax element selector configured for determining a mapping to obtain a syntax element on the basis of said hierarchy level; and
 an adapter configured for updating the mapping.

In the apparatus of the third embodiment of the invention the tree structure may be a coding tree.

In the apparatus of the fourth embodiment of the invention the coding tree may comprise a quad-tree.

The apparatus of the fourth embodiment of the invention may comprise a sorting table to define the mapping.

In the apparatus of the fourth embodiment of the invention said adapter may be configured for updating the sorting table.

The apparatus of the fourth embodiment of the invention said adapter may be configured for swapping two values in the sorting table.

The apparatus of the fourth embodiment of the invention may comprise at least two sorting tables, wherein the apparatus may further comprise a sorting table selector configured for using the hierarchy level to select a sorting table from said at least two sorting tables.

The apparatus of the fourth embodiment of the invention may comprise at least two sorting tables each comprising a set of code words and a set of syntax elements, wherein said sorting table selector may be configured for using the hierarchy level to select a sorting table from said at least two sorting tables; and said syntax element selector may be configured for using said code word to select the syntax element.

The apparatus of the fourth embodiment of the invention may comprise at least two sorting tables each comprising a set of code words, wherein said sorting table selector may be configured for using the hierarchy level to select a sorting table from said at least two sorting tables; said syntax element selector may be configured for using said code word to select the syntax element; and said adapter may be configured for swapping the syntax element with another syntax element of said set of syntax elements in the selected sorting table.

In the apparatus of the fourth embodiment of the invention the hierarchy level may correspond with a set of nodes that has the same distance from a root of the tree structure.

In the apparatus of the fourth embodiment of the invention the tree structure may relate to at least one of the following:
 a transform size;
 a prediction block size; or
 a macroblock size.

In the apparatus of the fourth embodiment of the invention the syntax element may relate to one of:
 a coded block pattern;
 a transform split pattern;
 a motion partition information.

A storage medium according to a fifth embodiment having stored thereon a computer executable program code for use by an encoder, said program codes comprise instructions for:
 receiving a syntax element to be encoded as a code word of a set of code words;
 determining a mapping between the syntax element and the code word on the basis of a hierarchy level in a tree structure;
 using the mapping to obtain the code word; and
 updating the mapping.

In the storage medium of the fifth embodiment of the invention the tree structure may be a coding tree.

In the storage medium of the fifth embodiment of the invention the coding tree may comprise a quad-tree.

The storage medium of the fifth embodiment of the invention may comprise instructions for using a sorting table to define the mapping.

In the storage medium of the fifth embodiment of the invention said updating the mapping may comprise instructions for updating the sorting table.

The storage medium of the fifth embodiment of the invention may comprise instructions for updating the mapping by swapping two values in the sorting table.

The storage medium of the fifth embodiment of the invention may comprise instructions for using at least two sorting tables, wherein the storage medium further comprises instructions for using the hierarchy level to select a sorting table from said at least two sorting tables.

The storage medium of the fifth embodiment of the invention may comprise instructions for using at least two sorting tables each comprising a set of code words, wherein the storage medium further comprises instructions for
 using the hierarchy level to select a sorting table from said at least two sorting tables; and
 using said syntax element to select the code word.

The storage medium of the fifth embodiment of the invention may comprise instructions for using at least two sorting tables each comprising a set of code words, wherein the storage medium further comprises instructions for
 using the hierarchy level to select a sorting table from said at least two sorting tables;

using said syntax element to select the code word; and
swapping the code word with another code word of said set of code words in the selected sorting table.

In the storage medium of the fifth embodiment of the invention the hierarchy level may correspond with a set of nodes that has the same distance from a root of the tree structure.

In the storage medium of the fifth embodiment of the invention the tree structure may relate to at least one of the following:
 a transform size;
 a prediction block size; or
 a macroblock size.

In the storage medium of the fifth embodiment of the invention the syntax element may relate to one of:
 a coded block pattern;
 a transform split pattern;
 a motion partition information.

A storage medium having according to a sixth embodiment having stored thereon a computer executable program code for use by a decoder, said program codes comprise instructions for:
 receiving a code word of a set of code words;
 determining a hierarchy level in a tree structure;
 determining a mapping to obtain a syntax element on the basis of said hierarchy level; and
 updating the mapping.

In the storage medium of the sixth embodiment of the invention the tree structure may be a coding tree.

In the storage medium of the sixth embodiment of the invention the coding tree may be a quad tree.

In the storage medium of the sixth embodiment of the invention said determining may comprise instructions for obtaining a syntax element from the determined sorting table on the basis of the code word.

The storage medium of the sixth embodiment of the invention may comprise instructions for using a sorting table to define the mapping.

In the storage medium of the sixth embodiment of the invention said updating the mapping may comprise instructions for updating the sorting table.

The storage medium of the sixth embodiment of the invention may comprise instructions for updating the mapping by swapping two values in the sorting table.

The storage medium of the sixth embodiment of the invention may comprise instructions for using at least two sorting tables, wherein the storage medium further comprises instructions for using the hierarchy level to select a sorting table from said at least two sorting tables.

The storage medium of the sixth embodiment of the invention may comprise instructions for using at least two sorting tables each comprising a set of code words and a set of syntax elements, wherein the storage medium further comprises instructions for
 using the hierarchy level to select a sorting table from said at least two sorting tables; and
 using said code word to select the syntax element.

The storage medium of the sixth embodiment of the invention may comprise instructions for using at least two sorting tables each comprising a set of code words and a set of syntax elements, wherein the storage medium further comprises instructions for
 using the hierarchy level to select a sorting table from said at least two sorting tables;
 using said code word to select the syntax element; and
 swapping the syntax element with another syntax element of said set of syntax elements in the selected sorting table.

In the storage medium of the sixth embodiment of the invention the hierarchy level may correspond with a set of nodes that has the same distance from a root of the tree structure.

In the storage medium of the sixth embodiment of the invention the tree structure may relate to at least one of the following:
 a transform size;
 a prediction block size; or
 a macroblock size.

In the storage medium of the sixth embodiment of the invention the syntax element may relate to one of:
 a coded block pattern;
 a transform split pattern;
 a motion partition information.

An apparatus according to a seventh embodiment comprises at least one processor;
 and at least one memory including computer program code;
 the at least one memory and the computer program code configured to, with the at least one processor, cause the apparatus at least to:
 receive a syntax element to be encoded as a code word of a set of code words;
 determine a mapping between the syntax element and the code word on the basis of a hierarchy level in a tree structure;
 use the mapping to obtain the code word; and
 update the mapping.

An apparatus according to an eighth embodiment comprises at least one processor;
 and at least one memory including computer program code;
 the at least one memory and the computer program code configured to, with the at least one processor, cause the apparatus at least to:
 receive a code word of a set of code words;
 determine a hierarchy level in a tree structure;
 determine a mapping to obtain a syntax element on the basis of said hierarchy level; and update the mapping.

An apparatus according to a ninth embodiment comprises
 means for receiving a syntax element to be encoded as a code word of a set of code words;
 means for determining a mapping between the syntax element and the code word on the basis of a hierarchy level in a tree structure;
 means for using the mapping to obtain the code word; and
 means for updating the mapping.

An apparatus according to a tenth embodiment comprises
 means for receiving a code word of a set of code words;
 means for determining a hierarchy level in a tree structure;
 means for determining a mapping to obtain a syntax element on the basis of said hierarchy level; and
 means for updating the mapping.

The invention claimed is:

1. A method comprising:
 receiving a syntax element to be encoded as a code word, wherein the syntax element relates to at least one of a coded block pattern, a transform split pattern, or motion partition information;
 determining, by a computing device, a mapping between the syntax element and the code word on the basis of a hierarchy level in a tree structure, wherein the tree structure relates to at least one of a transform block size, a prediction block size, or a block size, and wherein the hierarchy level represents division of a block into smaller blocks;

using the mapping to obtain the code word; and
updating the mapping.

2. The method according to claim 1, wherein the tree structure comprises a coding tree.

3. The method according to claim 2, wherein the coding tree comprises a quad-tree.

4. The method according to claim 1 wherein determining the mapping comprises using a sorting table to determine the mapping.

5. The method according to claim 4, wherein updating the mapping comprises updating the sorting table.

6. The method according to claim 4 wherein updating the mapping comprises updating the mapping by swapping two values in the sorting table.

7. The method according to claim 1, further comprising using at least two sorting tables, and using the hierarchy level to select a sorting table from said at least two sorting tables.

8. The method according to claim 1, further comprising using at least two sorting tables, wherein each of said at least two sorting tables comprises a set of code words, and wherein the method further comprises:
 using the hierarchy level to select a sorting table from said at least two sorting tables; and
 using said syntax element to select the code word.

9. The method according to claim 1, further comprising using at least two sorting tables, wherein each of said at least two sorting tables comprises a set of code words, and wherein the method further comprises:
 using the hierarchy level to select a sorting table from said at least two sorting tables;
 using said syntax element to select the code word; and
 swapping the code word with another code word of said set of code words of the selected sorting table.

10. The method according to claim 1, wherein the hierarchy level corresponds with a set of nodes with equal distance from a root of the tree structure.

11. A method comprising:
 receiving a code word;
 determining a hierarchy level in a tree structure, wherein the tree structure relates to at least one of a transform block size, a prediction block size, or a block size, and wherein the hierarchy level represents division of a block into smaller blocks;
 determining, by a computing device, a mapping to obtain a syntax element on the basis of said hierarchy level, wherein the syntax element relates to at least one of a coded block pattern, a transform split pattern, or motion partition information; and
 updating the mapping.

12. The method according to claim 11, wherein the tree structure comprises a coding tree.

13. The method according to claim 12, wherein the coding tree comprises a quad tree.

14. The method according to claim 11 wherein determining the mapping comprises using a sorting table to determine the mapping.

15. The method according to claim 14, wherein updating the mapping comprising updating the sorting table.

16. The method according to claim 15, wherein updating the mapping comprises updating the mapping by swapping two values in the sorting table.

17. The method according to claim 14, wherein determining the mapping comprises obtaining the syntax element from the sorting table on the basis of the code word.

18. The method according to claim 11, further comprising using at least two sorting tables, wherein the method further comprises using the hierarchy level to select a sorting table from said at least two sorting tables.

19. The method according to claim 11, further comprising using at least two sorting tables, wherein each of said at least two sorting tables comprises a set of code words and a set of syntax elements, and wherein the method further comprises
 using the hierarchy level to select a sorting table from said at least two sorting tables; and
 using said code word to select the syntax element.

20. The method according to claim 11, further comprising using at least two sorting tables, wherein each of said at least two sorting tables comprises a set of code words and a set of syntax elements, and wherein the method further comprises
 using the hierarchy level to select a sorting table from said at least two sorting tables;
 using said code word to select the syntax element; and
 swapping the syntax element with another syntax element of said set of syntax elements of the selected sorting table.

21. The method according to claim 11, wherein the hierarchy level corresponds with a set of nodes with equal distance from a root of the tree structure.

22. An apparatus comprising:
 a processor; and
 memory storing executable instructions configured to, with the processor, cause the apparatus at least to:
  receive a syntax element to be encoded as a code word, wherein the syntax element relates to at least one of a coded block pattern, a transform split pattern, or motion partition information;
  determine a mapping between the syntax element and the code word on the basis of a hierarchy level in a tree structure, wherein the tree structure relates to at least one of a transform block size, a prediction block size, or a block size, and wherein the hierarchy level represents division of a block into smaller blocks;
  use the mapping to obtain the code word; and
  update the mapping.

23. The apparatus according to claim 22, wherein the tree structure comprises a coding tree.

24. The apparatus according to claim 22, wherein determining the mapping comprises using a sorting table to determine the mapping.

25. The apparatus according to claim 24, wherein updating the mapping comprising updating the sorting table.

26. The apparatus according to claim 22, wherein the memory stores further executable instructions configured to, with the processor, cause the apparatus to use at least two sorting tables, and use the hierarchy level to select a sorting table from said at least two sorting tables.

27. The apparatus according to claim 26, wherein each of said at least two sorting tables comprises a set of code words, wherein the memory stores further executable instructions configured to, with the processor, cause the apparatus to:
 use the hierarchy level to select a sorting table from said at least two sorting tables; and
 use said syntax element to select the code word.

28. The apparatus according to claim 26, wherein each of said at least two sorting tables comprises a set of code words, wherein the memory stores further executable instructions configured to, with the processor, cause the apparatus to:
 use the hierarchy level to select a sorting table from said at least two sorting tables;
 use said syntax element to select the code word; and
 swap the code word with another code word of said set of code words in the selected sorting table.

29. An apparatus comprising:
a processor; and
memory storing executable instructions configured to, with the processor, cause the apparatus at least to:
receive a code word;
determine a hierarchy level in a tree structure, wherein the tree structure relates to at least one of a transform block size, a prediction block size, or a block size, and wherein the hierarchy level represents division of a block into smaller blocks;
determine a mapping to obtain a syntax element on the basis of said hierarchy level, wherein the syntax element relates to at least one of a coded block pattern, a transform split pattern, or motion partition information; and
update the mapping.

30. The apparatus according to claim 29, wherein the tree structure comprises a coding tree.

31. The apparatus according to claim 29, wherein determining the mapping comprises using a sorting table to determine the mapping.

32. The apparatus according to claim 31, wherein updating the mapping comprises updating the sorting table.

33. The apparatus according to claim 29 wherein the memory stores further executable instructions configured to, with the processor, cause the apparatus to use at least two sorting tables, and use the hierarchy level to select a sorting table from said at least two sorting tables.

34. The apparatus according to claim 33, wherein each of said at least two sorting tables comprises a set of code words and a set of syntax elements, and wherein the memory stores further executable instructions configured to, with the processor, cause the apparatus to:
use the hierarchy level to select a sorting table from said at least two sorting tables; and
use said code word to select the syntax element.

35. The apparatus according to claim 33, wherein each of said at least two sorting tables comprises a set of code words and a set of syntax elements, and wherein the memory stores further executable instructions configured to, with the processor, cause the apparatus to
use the hierarchy level to select a sorting table from said at least two sorting tables;
use said code word to select the syntax element; and
swap the syntax element with another syntax element of said set of syntax elements in the selected sorting table.

36. One or more non-transitory computer-readable media having stored thereon executable instructions configured to, when executed, cause an apparatus at least to:
receive a syntax element to be encoded as a code word, wherein the syntax element relates to at least one of a coded block pattern, a transform split pattern, or motion partition information;
determine a mapping between the syntax element and the code word on the basis of a hierarchy level in a tree structure, wherein the tree structure relates to at least one of a transform block size, a prediction block size, or a block size, and wherein the hierarchy level represents division of a block into smaller blocks;
use the mapping to obtain the code word; and
update the mapping.

37. The one or more non-transitory computer-readable media according to claim 36, wherein determining the mapping comprises using a sorting table to determine the mapping.

38. The one or more non-transitory computer-readable media according to claim 37, wherein updating the mapping comprises updating the sorting table.

39. The one or more non-transitory computer-readable media according to claim 36 having stored thereon further executable instructions configured to, when executed, cause the apparatus to: use at least two sorting tables, and use the hierarchy level to select a sorting table from said at least two sorting tables.

40. The one or more non-transitory computer-readable media according to claim 36, having stored thereon further executable instructions configured to, when executed, cause the apparatus to:
use at least two sorting tables, wherein each of said at least two sorting tables comprises a set of code words;
use the hierarchy level to select a sorting table from said at least two sorting tables; and
use said syntax element to select the code word.

41. The one or more non-transitory computer-readable media according to claim 36, having stored thereon further executable instructions configured to, when executed, cause the apparatus to:
use at least two sorting tables, wherein each of said at least two sorting tables comprises a set of code words;
use the hierarchy level to select a sorting table from said at least two sorting tables;
use said syntax element to select the code word; and
swap the code word with another code word of said set of code words in the selected sorting table.

42. One or more non-transitory computer-readable media having stored thereon executable instructions configured to, when executed, cause an apparatus at least to:
receive a code word;
determine a hierarchy level in a tree structure, wherein the tree structure relates to at least one of a transform block size, a prediction block size, or a block size, and wherein the hierarchy level represents division of a block into smaller blocks;
determine a mapping to obtain a syntax element on the basis of said hierarchy level, wherein the syntax element relates to at least one of a coded block pattern, a transform split pattern, or motion partition information; and
update the mapping.

43. The one or more non-transitory computer-readable media according to claim 42, wherein determining the mapping comprises using a sorting table to determine the mapping.

44. The one or more non-transitory computer-readable media according to claim 43, wherein updating the mapping comprises updating the sorting table.

45. The one or more non-transitory computer-readable media according to claim 43, wherein updating the mapping comprises updating the mapping by swapping two values in the sorting table.

46. The one or more non-transitory computer-readable media according to claim 43, wherein determining the mapping comprises obtaining the syntax element from the sorting table on the basis of the code word.

47. The one or more non-transitory computer-readable media according to claim 42 having stored thereon further executable instructions configured to, when executed, cause the apparatus to:
use at least two sorting tables; and
use the hierarchy level to select a sorting table from said at least two sorting tables.

48. The one or more non-transitory computer-readable media according to claim 42, having stored thereon further executable instructions configured to, when executed, cause the apparatus to:

use at least two sorting tables, wherein each of said at least two sorting tables comprises a set of code words and a set of syntax elements;
use the hierarchy level to select a sorting table from said at least two sorting tables; and
use said code word to select the syntax element.

49. The one or more non-transitory computer-readable media according to claim 42, having stored thereon further executable instructions configured to, when executed, cause the apparatus to:
use at least two sorting tables, wherein each of said at least two sorting tables comprises a set of code words and a set of syntax elements;
use the hierarchy level to select a sorting table from said at least two sorting tables;
use said code word to select the syntax element; and
swap the syntax element with another syntax element of said set of syntax elements in the selected sorting table.

50. An apparatus, comprising:
input circuitry configured to receive a syntax element to be encoded as a code word, wherein the syntax element relates to at least one of a coded block pattern, a transform split pattern, or motion partition information;
determination circuitry configured to determine a mapping between the syntax element and the code word on the basis of a hierarchy level in a tree structure, wherein the tree structure relates to at least one of a transform block size, a prediction block size, or a block size, and wherein the hierarchy level represents division of a block into smaller blocks;
code word selector circuitry configured to use the mapping to obtain the code word; and
adaptor circuitry configured to update the mapping.

51. An apparatus, comprising:
input circuitry configured to receive a code word;
determination circuitry configured to determine a hierarchy level in a tree structure, wherein the tree structure relates to at least one of a transform block size, a prediction block size, or a block size, and wherein the hierarchy level represents division of a block into smaller blocks;
code word selector circuitry configured to determine a mapping to obtain a syntax element on the basis of said hierarchy level, wherein the syntax element relates to at least one of a coded block pattern, a transform split pattern, or motion partition information; and
adaptor circuitry configured to update the mapping.

52. An apparatus comprising
means for receiving a syntax element to be encoded as a code word, wherein the syntax element relates to at least one of a coded block pattern, a transform split pattern, or motion partition information;
means for determining a mapping between the syntax element and the code word on the basis of a hierarchy level in a tree structure, wherein the tree structure relates to at least one of a transform block size, a prediction block size, or a block size, and wherein the hierarchy level represents division of a block into smaller blocks;
means for using the mapping to obtain the code word; and
means for updating the mapping.

53. An apparatus comprising
means for receiving a code word;
means for determining a hierarchy level in a tree structure, wherein the tree structure relates to at least one of a transform block size, a prediction block size, or a block size, and wherein the hierarchy level represents division of a block into smaller blocks;
means for determining a mapping to obtain a syntax element on the basis of said hierarchy level, wherein the syntax element relates to at least one of a coded block pattern, a transform split pattern, or motion partition information; and
means for updating the mapping.

\* \* \* \* \*